(12) United States Patent
Kirsch et al.

(10) Patent No.: US 6,635,318 B2
(45) Date of Patent: Oct. 21, 2003

(54) TETRACYCLIC AND PENTACYCLIC COMPOUNDS, AND THEIR USE IN LIQUID-CRYSTALLINE MEDIA

(75) Inventors: Peer Kirsch, Darmstadt (DE); Joachim Krause, Dieburg (DE); Georg Lüssem, Ober-Ramstadt (DE); Dagmar Klement, Grob-Zimmern (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 91 days.

(21) Appl. No.: 09/927,550

(22) Filed: Aug. 13, 2001

(65) Prior Publication Data
US 2003/0078447 A1 Apr. 24, 2003

(30) Foreign Application Priority Data

Aug. 18, 2000 (DE) .......................... 100 40 375

(51) Int. Cl.[7] ................ C09K 19/30; C07C 25/13; C07C 25/24; C07C 22/08; C07C 22/04
(52) U.S. Cl. ............... 428/1.1; 252/299.63; 570/127; 570/128; 570/129; 570/144
(58) Field of Search ............ 252/299.63; 570/127, 570/128, 129, 144; 428/1.1; 558/260, 426; 560/65; 568/39, 660

(56) References Cited

PUBLICATIONS

Kirsch et al. "Diflurooxymethylene Bridged–Liquid Crystals: A Novel Synthesis Based on the Oxidative Alkoxydiflurodesulfuration of Dithianylium Salts", Agnew. Chem. Int. Ed. vol. 40, No. 8, pp. 1480–1484, Apr. 2001.*

* cited by examiner

Primary Examiner—Shean C. Wu
(74) Attorney, Agent, or Firm—Millen, White, Zelano & Branigan, P.C.

(57) ABSTRACT

Disclosed is a tetracyclic compound of the formula I

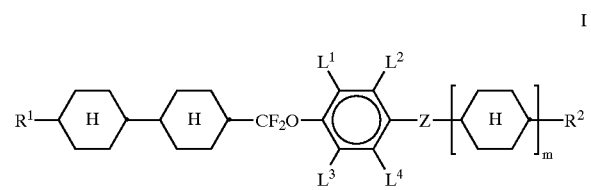

in which
R$^1$, R$^2$ are each, independently of one another, an alkyl or alkenyl radical having up to 15 carbon atoms which is unsubstituted, monosubstituted by CN or CF$_3$, or monosubstituted by halogen. One or more CH$_2$ groups in these radicals may also, in each case independently of one another be replaced by —O—, —S—,

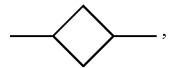

—CO—, —CO—O—, —O—CO— or —O—CO—O— such that the O atoms are not linked directly to one another. Z is —OCF$_2$—, —CF$_2$O— or a single bond. L$^1$, L$^2$, L$^3$, and L$^4$ are each, independently of one another, H or F. m is 1 or 2. Similar compounds, as well as liquid-crystalline media having these compounds, are also disclosed.

20 Claims, No Drawings

TETRACYCLIC AND PENTACYCLIC COMPOUNDS, AND THEIR USE IN LIQUID-CRYSTALLINE MEDIA

The present invention relates to neutral tetracyclic and pentacyclic compounds of the formula I, and to their use in liquid-crystalline media.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and give short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, dielectric anisotropy and optical anisotropy, have to satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high specific resistance, good UV and temperature stability and low vapour pressure are desired for matrix liquid-crystal displays having integrated non-linear elements for switching individual pixels (MLC displays).

Matrix liquid-crystal displays of this type are known. Non-linear elements which can be used for individual switching of the individual pixels are, for example, active elements (i.e. transistors). Reference is then made to an "active matrix", where a distinction can be made between two types:

1. MOS (metal oxide semiconductor) or other diodes on a silicon wafer as substrate.
2. Thin-film transistors (TFTs) on a glass plate as substrate.

The use of monocrystalline silicon as substrate material restricts the display size, since even modular assembly of various part-displays results in problems at the joints.

In the case of more promising type 2, which is preferred, the electro-optical effect used is usually the TN effect. A distinction is made between two technologies: TFTs comprising compound semiconductors, such as, for example, CdSe or TFTs based on polycrystalline or amorphous silicon. The latter technology is being worked on intensively worldwide.

The TFT matrix is applied to the inside of one glass plate of the display, while the other glass plate carries the transparent counterelectrode on its inside. In contrast to the size of the pixel electrode, the TFT is very small and has virtually no interfering effect on the image. This technology can also be extended to fully color-compatible displays, in which a mosaic of red, green and blue filters is arranged in such a way that a filter element is opposite each switchable pixel.

The TFT displays usually operate as TN cells with crossed polarizers in transmission and are lit from the back.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to the insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SCHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display worsens, and the problem of after-image elimination can occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures of the prior art are also particularly disadvantageous. The demands are that no crystallization and/or smectic phases occur, even at low temperatures, and the temperature dependence of the viscosity is as low as possible. The MLC displays from the prior art thus do not meet today's requirements.

Besides liquid-crystal displays which use back-lighting, i.e. are operative transmissively and optionally transflectively, there is also particular interest in reflective liquid-crystal displays. These reflective liquid-crystal displays use the ambient light for information display. They thus consume significantly less energy than back-lit liquid-crystal displays of corresponding size and resolution. Since the TN effect is characterized by very good contrast, reflective displays of this type are readily legible even under bright ambient conditions. This is already known of simple reflective TN displays, as used, for example, in wristwatches and pocket calculators. However, the principle can also be applied to high-quality, higher-resolution active matrix-addressed displays, such as, for example, TFT displays. Here, as is already the case in the generally conventional transmissive TFT-TN displays, the use of liquid crystals of low birefringence ($\Delta n$) is necessary in order to achieve low optical retardation (d·$\Delta n$). This low optical retardation results in a low viewing-angle dependence of the contrast, which is usually acceptable (cf. DE 30 22 818). In reflective displays, the use of liquid crystals of low birefringence is much more important than in transmissive displays, since in reflective displays, the effective layer thickness through which the light passes is approximately twice as great as in transmissive displays of the same layer thickness.

Besides the lower power consumption (no back-lighting necessary), other advantages of reflective displays over transmissive displays are the space saving, which results in a very low installation depth, and the reduction in problems caused by temperature gradients due to different heating by the back-lighting.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:

expanded nematic phase range (in particular down to low temperatures)

switchability at extremely low temperatures (outdoor use, automobile, avionics)

increased resistance to UV radiation (longer life)

lower threshold (addressing) voltage low birefringence for an improved viewing angle range.

The media available from the prior art do not allow these advantages to be achieved while simultaneously achieving the other parameters.

In the case of supertwisted (STN) cells, media are desired which enable greater multiplexability and/or lower threshold voltages and/or broader nematic phase ranges (in particular at low temperatures). To this end, a further increase in the available parameter latitude (clearing point, smectic-nematic transition or melting point, viscosity, dielectric parameters, elastic parameters) is urgently desired.

The invention has an object of providing media for MLC, TN or STN displays of this type, in particular for reflective MLC displays, which do not have the above-mentioned disadvantages or only do so to a reduced extent, and preferably at the same time have very high specific resistance values and low threshold voltages.

Upon further study of the specification and appended claims, further objects and advantages of this invention will become apparent to those skilled in the art.

It has now been found that these and other objects can be achieved if compounds of the formula I below are used in liquid-crystalline media. The compounds according to the invention are distinguished, in particular, by their high clearing point, low rotational viscosity and low birefringence.

The invention relates to tetracyclic and pentacyclic compounds of the general formula I

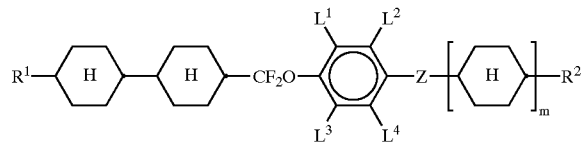

I in which

R$^1$ and R$^2$ are each, independently of one another, an alkyl or alkenyl radical having up to 15 carbon atoms which is unsubstituted, monosubstituted by CN or CF$_3$ or at least monosubstituted by halogen, where one or more CH$_2$ groups in these radicals may also, in each case independently of one another, be replaced by —O—, —S—,

—CO—, —CO—C—, —O—CO— or —O—CO—O— in such a way that O atoms are not linked directly to one another, and Z is —OCF$_2$—, —CF$_2$O— or a single bond, L$^1$, L$^2$, L$^3$ and L$^4$ are each, independently of one another, H or F, and m is 1 or 2.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or, in particular, the optical anisotropy of a dielectric of this type and/or to optimize its threshold voltage and/or its viscosity.

In the pure state, the compounds of the formula I are colorless and form liquid-crystalline mesophases in a temperature range favorable for electro-optical use. They are stable chemically, thermally and in the presence of light.

If R$^1$ and/or R$^2$ is an alkyl radical and/or an alkoxy radical, this radical may be straight-chain or branched. The radical is preferably straight-chain, has 2, 3, 4, 5, 6 or 7 carbon atoms, and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

If R$^1$ and R$^2$ is an oxalkyl radical, it is preferably straight-chain 2-oxapropyl(=methoxymethyl), 2-(=ethoxymethyl) or 3-oxabutyl(=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R$^1$ and/or R$^2$ is an alkyl radical in which one CH$_2$ group has been replaced by —CH═CH—, this may be straight-chain or branched. It is preferably straight-chain and has 2 to 10 carbon atoms. Accordingly, it is in particular preferably vinyl, prop-1- or -2-enyl, but-1-, -2- or -3-enyl, pent-1-, -2-, -3- or -4-enyl, hex-1-, -2-, -3-, 4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If R$^1$ and/or R$^2$ is an alkyl radical in which one CH$_2$ group has been replaced by —O— and one has been replaced by —CO—, these replacements are preferably adjacent. These alkyl radicals thus contain an acyloxy group —CO—O— or an oxycarbonyl group —O—CO—. These radicals are preferably straight-chain and have 2 to 6 carbon atoms. Accordingly, they are in particular preferably acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^1$ and/or $R^2$ is an alkyl radical in which one $CH_2$ group has been replaced by unsubstituted or substituted —CH=CH— and an adjacent $CH_2$ group has been replaced by CO or CO—O or O—CO, the alkyl radical may be straight-chain or branched. It is preferably straight-chain and has 4 to 13 carbon atoms. Accordingly, it is in particular preferably acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^1$ and/or $R^2$ is an alkyl or alkenyl radical which is monosubstituted by CN or $CF_3$, this radical is preferably straight-chain. The substitution by CN or $CF_3$ is in any desired position.

If $R^1$ and/or $R^2$ is an alkyl or alkenyl radical which is at least monosubstituted by halogen, this radical is preferably straight-chain and the halogen is preferably F or Cl. In the case of polysubstitution, the halogen is preferably F. The resultant radicals also include perfluorinated radicals. In the case of monosubstitution, the fluorine or chlorine substituent may be in any desired position, but is preferably in the ω-position.

Compounds of the formula I which contain wing groups $R^1$ and/or $R^2$ which are suitable for polymerization reactions are suitable for the preparation of the liquid-crystalline polymers.

Compounds of the formula I containing branched wing groups $R^1$ and/or $R^2$ can be of importance owing to better solubility in the conventional liquid-crystalline base materials, but in particular are important as chiral dopants if the compounds are optically active. Smectic compounds of this type are suitable as components of ferroelectric materials.

Compounds of the formula I having $S_A$ phases are suitable, for example, for thermally addressed displays.

Branched groups of this type generally contain not more than one chain branch. Preferred branched radicals $R^1$ and/or $R^2$ are isopropyl, 2-butyl(=1-methylpropyl), isobutyl(=2-methylpropyl), 2-methylbutyl, isopentyl(=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If $R^1$ and/or $R^2$ is an alkyl radical in which two or more $CH_2$ groups have been replaced by —O— and/or —CO—O—, this may be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)-hexyl, 7,7-bis(methoxycarbonyl)heptyl, 8,8-bis(methoxycarbonyl)octyl, bis(ethoxycarbonyl)methyl, 2,2-bis-(ethoxycarbonyl)ethyl, 3,3-bis(ethoxycarbonyl)propyl, 4,4-bis(ethoxycarbonyl)butyl or 5,5-bis(ethoxycarbonyl)hexyl.

The radicals $R^1$ and/or $R^2$ in the compounds of the formula I are preferably a straight-chain alkyl or alkenyl radical having up to 8 carbon atoms.

In the compounds of the formula I, Z is preferably a group having single bonds and more preferably is —$OCF_2$—.

The compounds of the formula I are prepared by methods known in the art, and as described in the literature (for example in the standard works, such as Houben-Weyl, Methoden der organischen Chemie [Methods of organic Chemistry], Georg-Thieme-Verlag, Stuttgart, to be precise under reaction conditions which are known and suitable for said reactions. Use can also be made here of variants which are known in the art, but are not mentioned here in greater detail.

The compounds according to the invention can be prepared, for example, as follows:

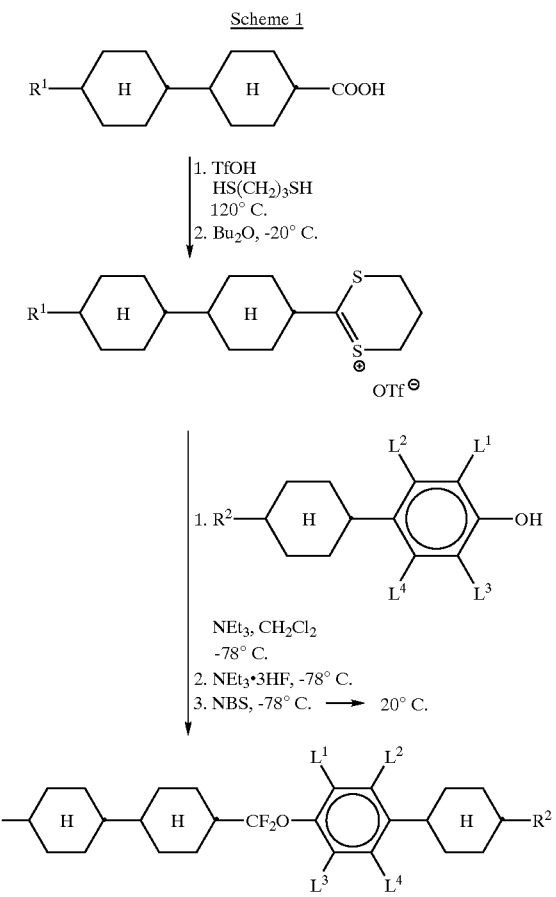

Scheme 1

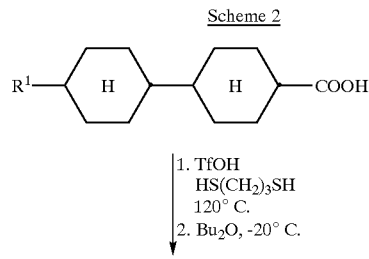

Scheme 2

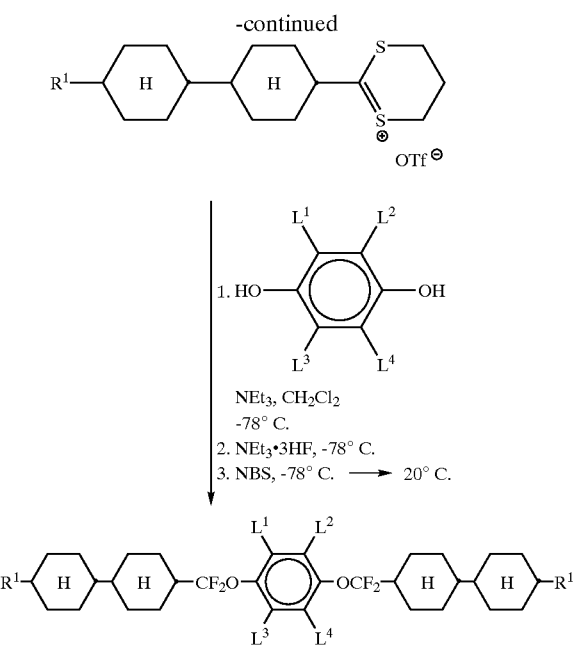

The invention furthermore relates to liquid-crystalline media which comprise one, two, three or more compounds of the formula I. In particular in the case of low Δn mixtures (Δn≦0.08), the problem frequently exists that high-clearing compounds having a low Δn value almost always have smectic phases. In liquid-crystalline mixtures, compounds of this type result in LTS (low temperature stability) problems. The mixtures currently used frequently comprise tetracyclic compounds having an ester structure, but these compounds significantly impair the reliability of the mixture, depending on the concentration employed. The mixtures according to the invention comprising compounds of the formula I are distinguished by their good reliability, a high clearing point, and by their low rotational viscosity values $\gamma_1$.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention allow a significant increase in the available parameter latitude.

The combinations of clearing point, viscosity at low temperature, thermal and UV stability and dielectric and optical anisotropy and threshold voltage achievable by the liquid crystal mixtures of the inventions are far superior to known materials from the prior art.

The requirement for a high clearing point, nematic phase at low temperature and simultaneously a low threshold voltage has hitherto only been achieved inadequately. Although liquid-crystal mixtures such as, for example, MLC-6476 and MLC-6625 (Merck KGaA, Darmstadt, Germany) have comparable clearing points and low-temperature stabilities, they have, however, both much higher Δn values of about 0.075 and much higher threshold voltages of about ≧1.7 V.

The nematic phase of the liquid crystal of the invention is retained down to −20° C., preferably down to −30° C., particularly preferably down to −40° C. Clearing points are above 80° C., preferably above 90° C., and are particularly preferably above 100° C. The liquid-crystal mixtures according to the invention at the same time allow birefringence values of ≦0.080, preferably ≦0.070, and in particular ≦0.065 low threshold voltage is also achieved, allowing excellent STN and MLC displays, in particular excellent reflective MLC displays, to be obtained. In particular, the mixtures are characterized by low operating voltages. The TN thresholds are <2.5 V, preferably below 2.3 V, and particularly preferably are <2.25 V. Specifically, reflective MLC mixtures of the invention are distinguished by TN thresholds of <1.8 V.

A suitable choice of the components of the mixtures according to the invention can allow higher clearing points (for example above 110° C.) to be achieved along with lower dielectric anisotropy values and thus higher threshold voltages, or can allow lower clearing points to be achieved at the same time as higher dielectric anisotropy values (for example >12) and thus lower threshold voltages (for example <1.5 V), while retaining the other advantageous properties. Likewise, mixtures of higher Δε and thus lower thresholds can also be obtained at viscosities which are increased correspondingly little. The MLC displays according to the invention, apart from reflective displays, preferably operate at the first Gooch and Tarry transmission minimum [as defined by C. H. Gooch and H. A. Tarry, Electron. Lett. 10, 2–4, 1974; C. H. Gooch and H. A. Tarry, Appl. Phys., Vol. 8, 1575–1584, 1975]. There, besides having particularly favorable electro-optical properties, such as, for example, high steepness of the characteristic line and a low angle of dependence of the contrast (German Patent 30 22 818), a lower dielectric anisotropy is sufficient at the same threshold voltage as in an analogous display at the second minimum. This enables significantly higher specific resistance values to be achieved at the first minimum using the mixtures according to the invention than in the case of mixtures comprising cyano compounds. Through a suitable choice of the individual components and their proportions by weight, the person skilled in the art can establish the birefringence necessary for a specified layer thickness of the MLC display using simple routine methods. The requirements of reflective MLC displays are described, for example, in Digest of Technical Papers, SID Symposium 1998.

The rotational viscosity $\gamma_1$ at 20° C. is preferably <200 mPa.s, particularly preferably <180 mPa.s, and in particular <165 mPa.s. The nematic phase range preferably extends at least from −20° to +80°. The nematic phase range is more preferably at least 90°, and in particular preferably at least 100°.

Measurements of the capacity holding ratio (HR), also known as the voltage holding ratio [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I have an adequate HR for MLC displays.

The media according to the invention preferably comprise a plurality, preferably two or three, of compounds of the formula I. The proportion of these compounds present in the media is preferably 5–50% of the media by weight of the whole media, more preferably 5–40%, and particularly preferably in the range 5–35%.

The individual compounds of the formulae I to XV and their sub-formulae which can be used in the media according to the invention are either known or can be prepared analogously to the known compounds.
Preferred embodiments are indicated below:
Preferred compounds of the formula I are compounds of the formulae Ia to Ij:
in which
$R^{1a}$ and $R^{1b}$ are each, independently of one another, H, $CH_3$, $C_2H_5$ or n-$C_3H_7$,
m is 1 or 2, and
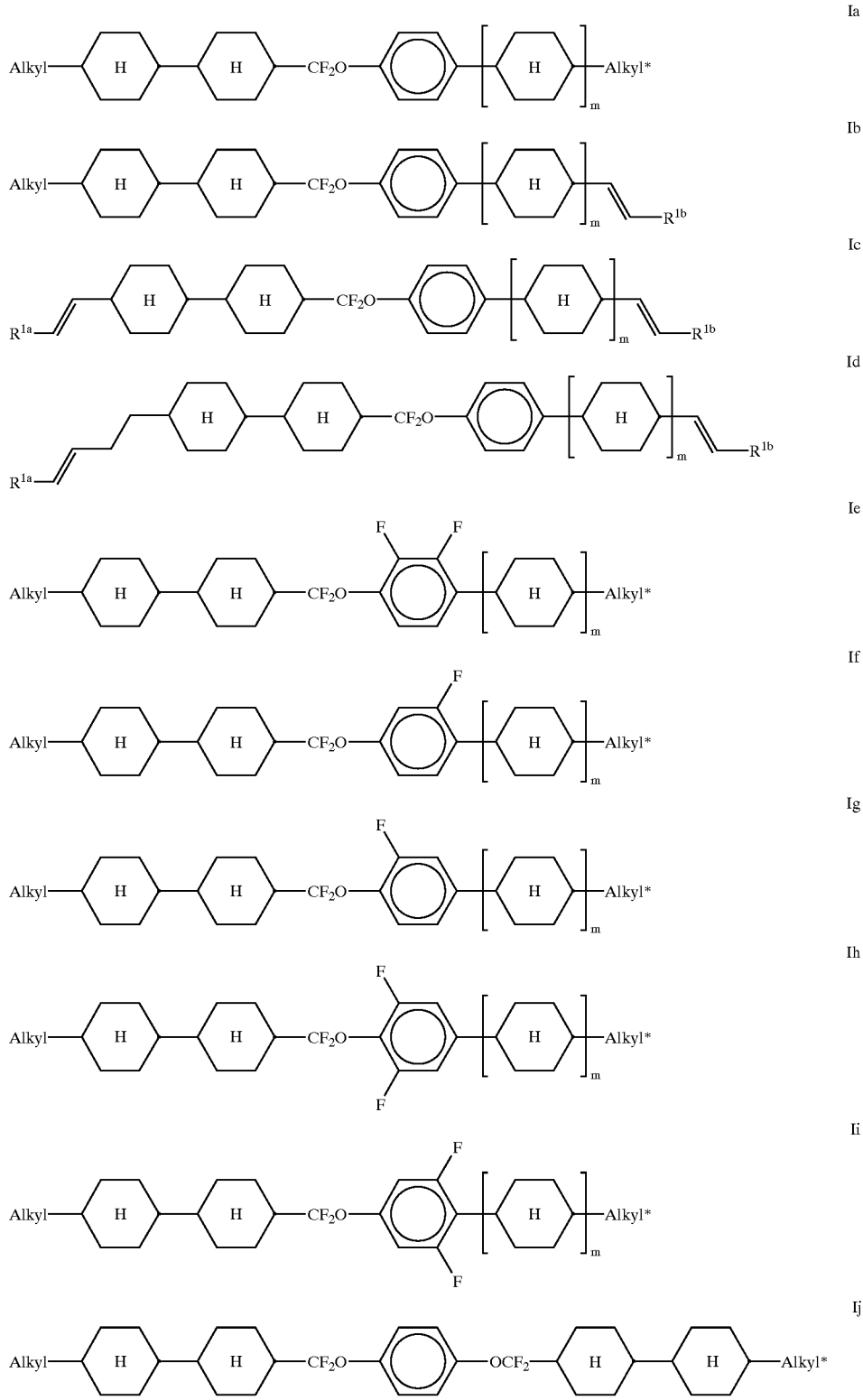

the Alkyl and Alkyl* groups are each, independently of one another, straight-chain and branched alkyl groups having 1–7 carbon atoms.

In the compounds of the formula I, $R^1$ and $R^2$ are each, independently of one another, preferably a straight-chain alkyl radical having 1–8 carbon atoms or an alkenyl radical having 2–8 carbon atoms. Particularly preferred radical groups for $R^1$ and $R^2$ are methyl, ethyl, n-propyl, n-pentyl, vinyl, 1 E-propenyl and 3-butenyl.

In the compounds of the formula I, m is preferably 1.

Besides one or more compounds of the formula I, the medium additionally comprises one or more compounds selected from the group consisting of the general formulae II to VIII:

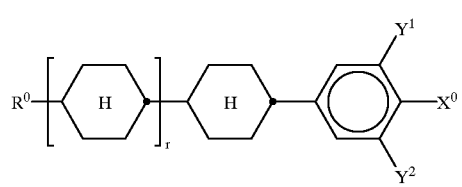

II

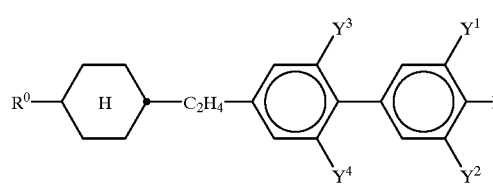

III

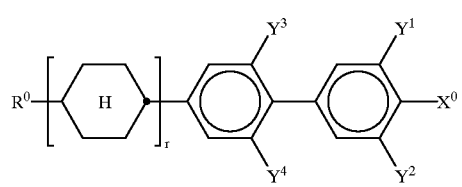

IV

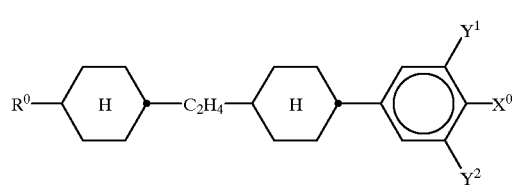

V

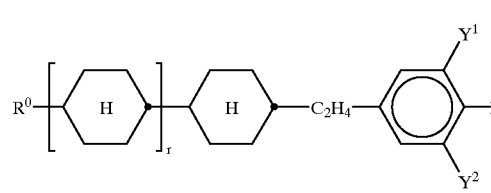

VI

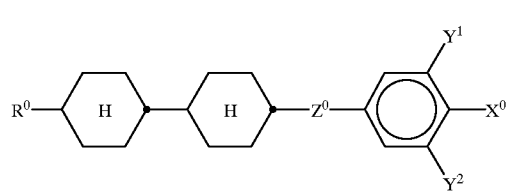

VII

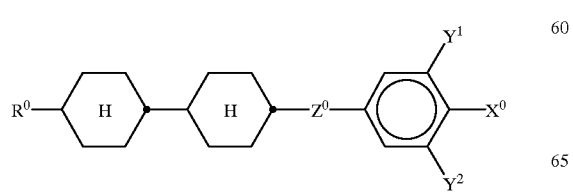

VIII

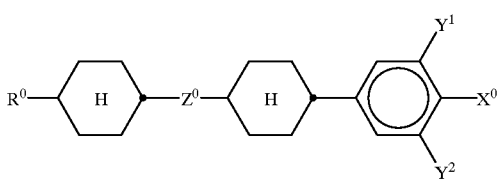

in which the individual radicals have the following meanings:

$R^0$: n-alkyl, oxaalkyl, fluoroalkyl or alkenyl, in each case having up to 9 carbon atoms, $X^0$: F, Cl, a halogenated alkyl group or alkoxy group having 1 to 6 carbon atoms, or halogenated alkenyl having 2 to 6 carbon atoms, $Z^0$: —$C_4H_8$—, —$CF_2O$—, —$OCF_2$—, —$CH_2O$—, —$OCH_2$—, —CF=CF—, —$C_2F_4$— or —CH=CH—, $Y^1$ to $Y^4$: are each, independently of one another, H or F, r: 0 or 1.

The medium preferably comprises two, three, four or five compounds of the formula II;

The medium preferably comprises one or more compounds of the formulae IIa to IIh:

IIa

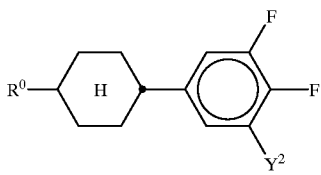

IIb

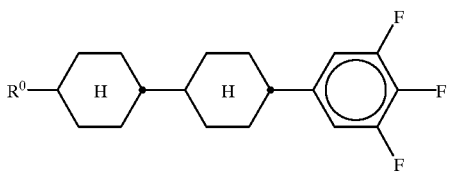

IIc

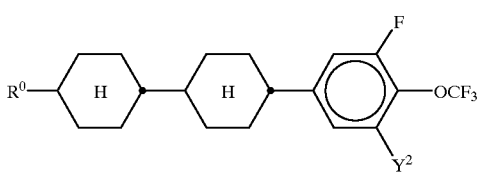

IId

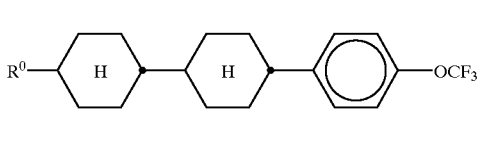

IIe

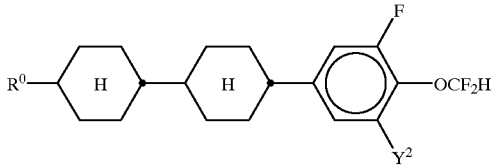

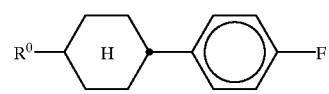
IIf
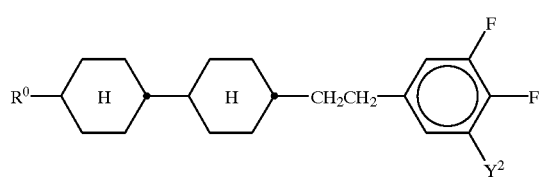
IIg
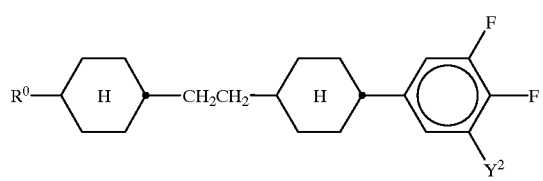
IIh
The compound of the formula IV is preferably
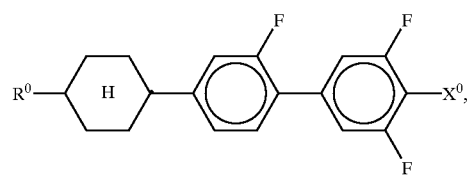
IVa
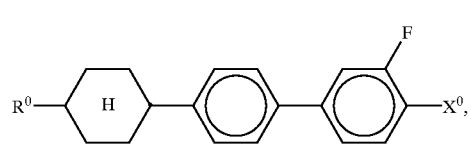
IVb
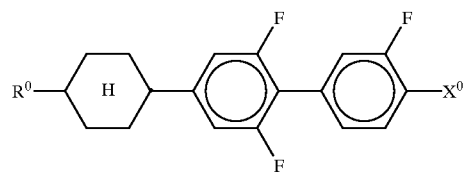
IVc
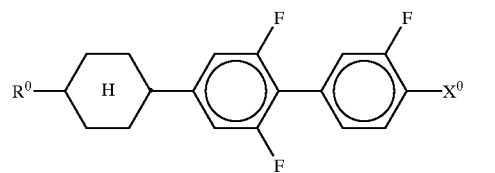
IVd or
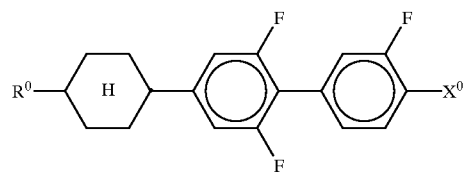
IVe.
The medium additionally comprises one or more compounds selected from the group consisting of the general formulae IX to XV:
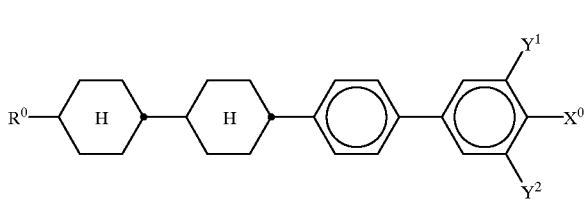
IX
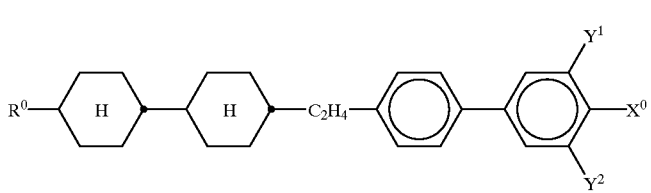
X
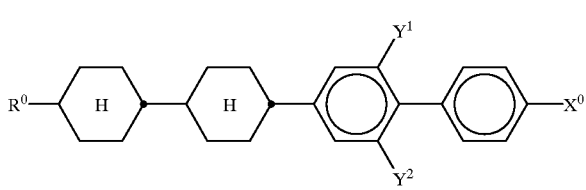
XI -continued

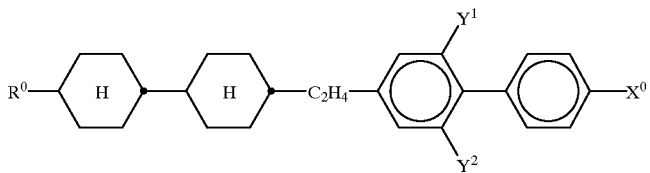
XII

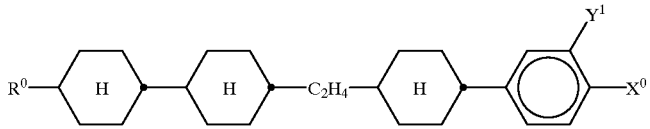
XIII

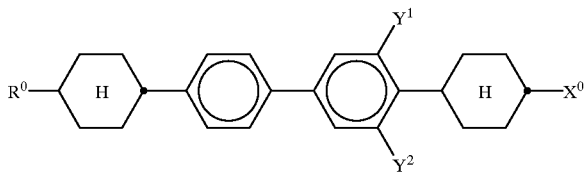
XIV

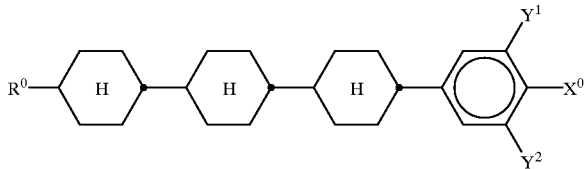
XV in which $R^0$, $X^0$, $Y^1$ and $Y^2$ are each, independently of one another, as defined herein. In the compounds of the formulae II to XIX, $X^0$ is preferably F, Cl, $CF_3$, $OCF_3$, $OCHF_2$, more preferably F and $OCF_3$, and in particular $OCHF_2$. $R^0$ is preferably an alkyl, oxaalkyl, fluoroalkyl, alkenyloxy or alkenyl group, each having up to 6 carbon atoms.

The medium additionally comprises one or more compounds of the formulae

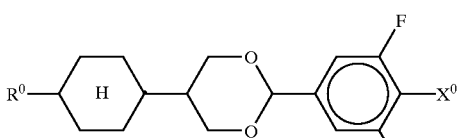

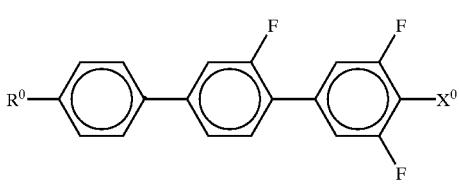

in which $R^0$ and $X^0$ are as defined above;

The medium additionally comprises one or more ester compounds of the formulae E1 to E5

E1
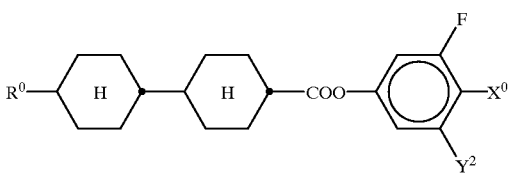

E2
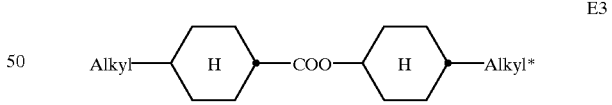

E3
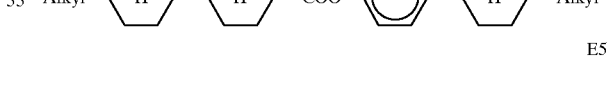

E4

E5 in which $R^0$, $X^0$, $Y^1$, $Y^2$ and $Y^3$ are as defined above. Alkyl and Alkyl* are each a straight-chain alkyl radical having 1 to 7 carbon atoms.

The medium additionally comprises one or more compounds of the formula VIIa and/or VIIb:

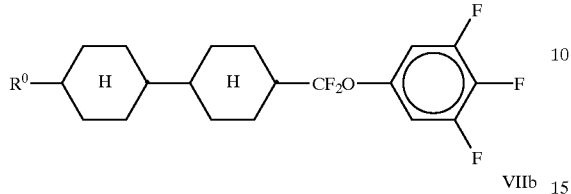

VIIa

VIIb

The medium additionally comprises one or more compounds of the formulae Xa to Xd:

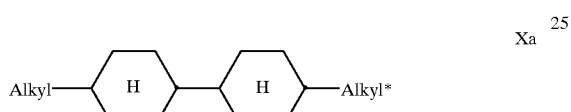

Xa

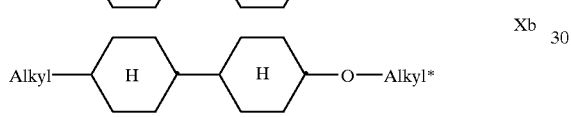

Xb

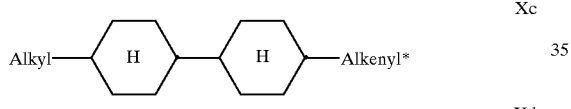

Xc

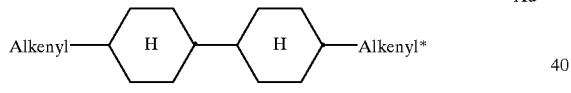

Xd

The medium additionally comprises one or more compounds of the formula E1a and/or E1b:

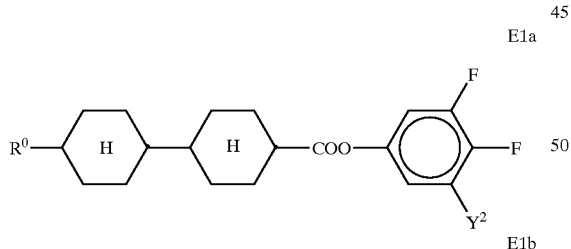

E1a

E1b in which $R^0$ and $Y^2$ are as defined above.

The proportion of compounds of the formulae I to VIII together in the mixture as a whole is at least 50% by weight;

The proportion of compounds of the formula I in the mixture as a whole is from 5 to 50% by weight;

The proportion of compounds of the formulae II to VIII in the mixture as a whole is from 20 to 80% by weight;

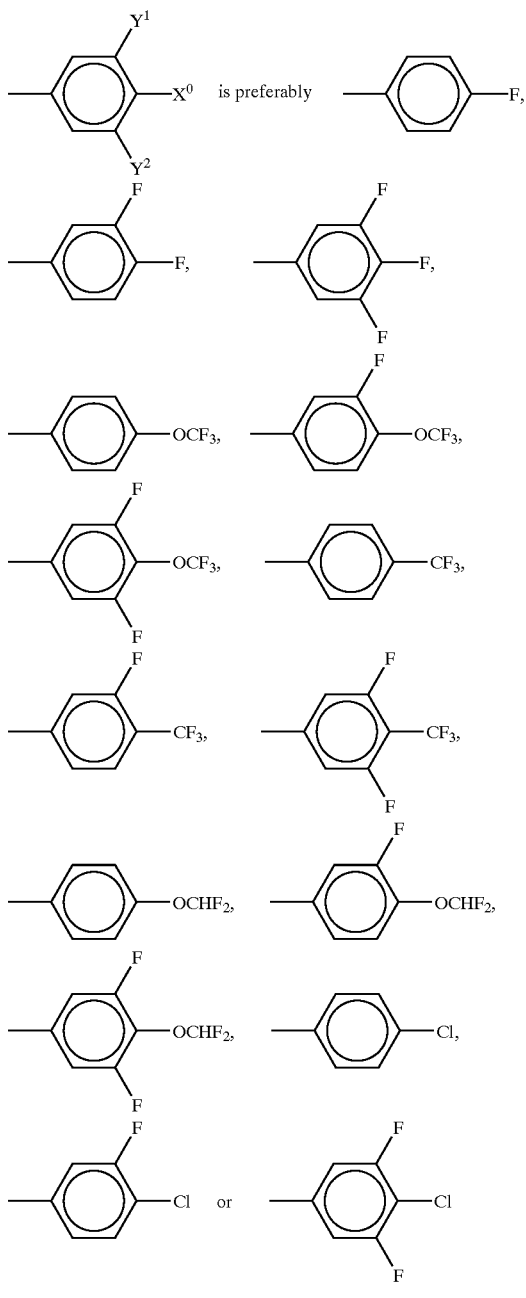

The medium comprises compounds of the formulae II, III, IV, V, VI, VII or VIII;

$R^0$ is preferably straight-chain alkyl or alkenyl having 2 to 7 carbon atoms;

The medium essentially consists of compounds of the formulae I to VIII;

The medium comprises further compounds, preferably selected from the following group consisting of the general formulae XVI to XX:

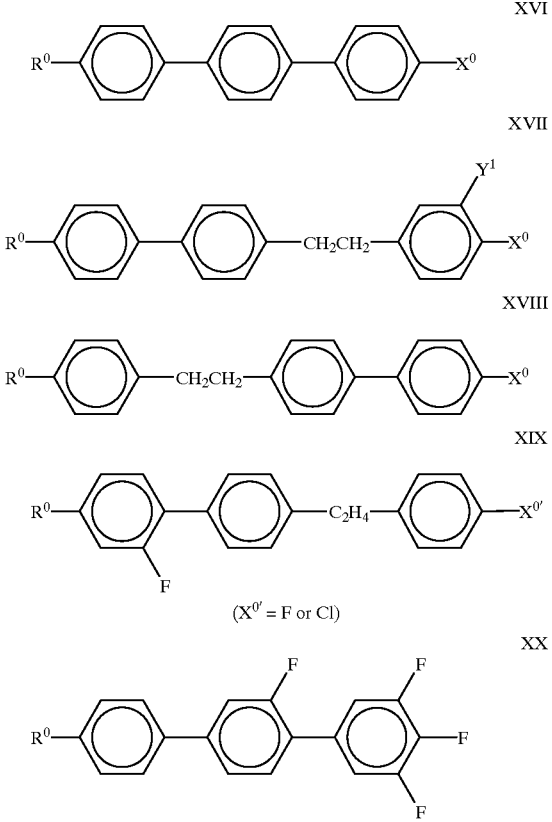

$R^0$ and $X^0$ are as defined above, and the 1,4-phenylene rings may be substituted by CN, chlorine or fluorine. The 1,4-phenylene rings are preferably monosubstituted or polysubstituted by fluorine atoms.

The Formula I : (Formulae II+III+IV+V+VI+VII+VIII) weight ratio is preferably from 1:10 to 10:1.

The medium consists essentially of compounds selected from the group consisting of the general formulae I to XV.

The proportion of compounds of the formulae Xa to Xd in the mixture as a whole is about 3–45% by weight, preferably about 5–40% by weight, and in particular about 5–30% by weight.

The proportion of compounds of the formula E1 in the mixture as a whole is about 10–60% by weight of the mixture, preferably about 10–45% by weight, and more preferably about 15–40% by weight.

The proportion of compounds of the formulae E2 and/or E3 in the mixture as a whole is about 1–30% by weight, preferably about 3–20% by weight and more preferably about 3–15% by weight.

The proportion of compounds of the formula E4 is preferably about $\leq 20\%$ by weight, in particular about $\leq 10\%$ by weight.

It has been found that even a relatively small proportion of compounds of the formula I mixed with conventional liquid-crystal materials, but in particular with one or more compounds of the formulae II, III, IV, V, VI, VII and/or VIII, results in a reduction in the threshold voltage and in low birefringence values, with broad nematic phases with low smectic-nematic transition temperatures being observed at the same time, drastically improving the storage stability of the mixture. Particularly preferred are mixtures which, besides one or more compounds of the formula I, comprise one or more compounds of the formula IV, and in particular compounds of the formula IVa in which $X^0$ is F or $OCF_3$.

The compounds of the formulae I to VIII are colorless, stable, and readily miscible with one another and with other liquid-crystalline materials.

The term "Alkyl" or "Alkyl*" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "Alkenyl" or "Alkenyl*" covers straight-chain and branched alkenyl groups having 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_uH_{2u+1}$—O—$(CH_2)_v$, in which u and v are each, independently of one another, from 1 to 6. More preferably, u is 1 and v is from 1 to 6.

Through a suitable choice of the meanings of $R^0$ and $X^0$, the response times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in short addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and smaller values of $k_{33}/k_{11}$ compared with alkyl and alkoxy radicals.

The optimum mixing ratio of the compounds of the formulae I and II+III+IV–V+VI+VII+VIII depends substantially on the desired properties, on the choice of the components of the formulae I, II, III, IV, V, VI, VII and/or VIII, and on the choice of any other components which may be present. Suitable mixing ratios within the range given above can be determined from case to case.

The total amount of compounds of the formulae I to XV in the mixtures according to the invention is not crucial. The mixtures can therefore comprise one or more further components in order to optimize various properties. However, the observed effect on the response times and the threshold voltage is generally greater, when the total concentration of compounds of the formulae I to XX is higher.

In a particularly preferred embodiment, the media according to the invention comprise compounds of the formulae II to VIII (preferably II, III and/or IV, in particular IVa) in which $X^0$ is F, $OCF_3$, $OCHF_2$, $OCH=CF_2$, $OCF=CF_2$ or $OCF_2$—$CF_2H$. A favourable synergistic effect with the compounds of the formula I results in particularly advantageous properties. In particular, mixtures comprising compounds of the formula I and of the formula IVa are distinguished by their low threshold voltage.

The construction of the MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si, TFT, or MIM.

An essential difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation. It is also possible to prepare the mixtures in another conventional manner, for example by using premixes, for example homologue mixtures, or using so-called "multi-bottle" systems.

The dielectrics may also comprise further additives known to the person skilled in the art and described in the literature. For example, 0–15%, preferably 0–10%, of pleochroic dyes and/or chiral dopants can be added. The additives are each employed in concentrations of from 0.01 to 6%, preferably from 0.1 to 3%. However, the concentration data for the other constituents of the liquid-crystal mixtures, i.e. of the liquid-crystalline or mesogenic compounds, are given without taking into account the concentration of these additives.

In the present application and in the examples below, C denotes a crystalline phase, S a smectic phase, $S_C$ a smectic C phase, N a nematic phase and I the isotropic phase.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. n and m are integers, preferably 1, 2, 3, 4, 5, 6, 7, 8, 9, 10, 11 and 12, where n can be =m or n≠m. The coding in Table B is self-evident. In Table A, only the acronym for the parent structure is given, followed, separated from the acronym for the parent structure by a hyphen, by a code for the substituents $R^{1*}$, $R^{2*}$, $L^{1*}$ and $L^{2*}$:

| Code for $R^{1*}R^{2*}$, $L^{1*}, L^{2*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| V-T | CH$_2$=CH | CF$_3$ | H | H |
| V2-T | CH$_2$=CH—C$_2$H$_4$ | CF$_3$ | H | H |
| 1V-OT | CH$_3$—CH=CH | OCF$_3$ | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |
| nOCCF$_2$.F.F | $C_nH_{2n+1}$ | OCH$_2$CF$_2$H | F | F |

Preferred mixture components are shown in Tables A and B:

TABLE A

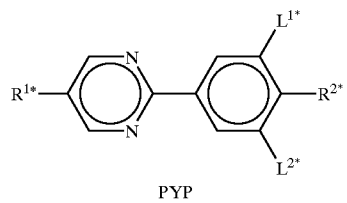

PYP

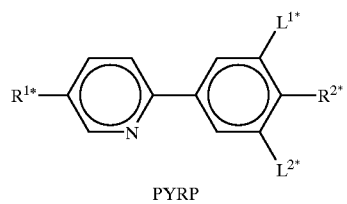

PYRP

TABLE A-continued
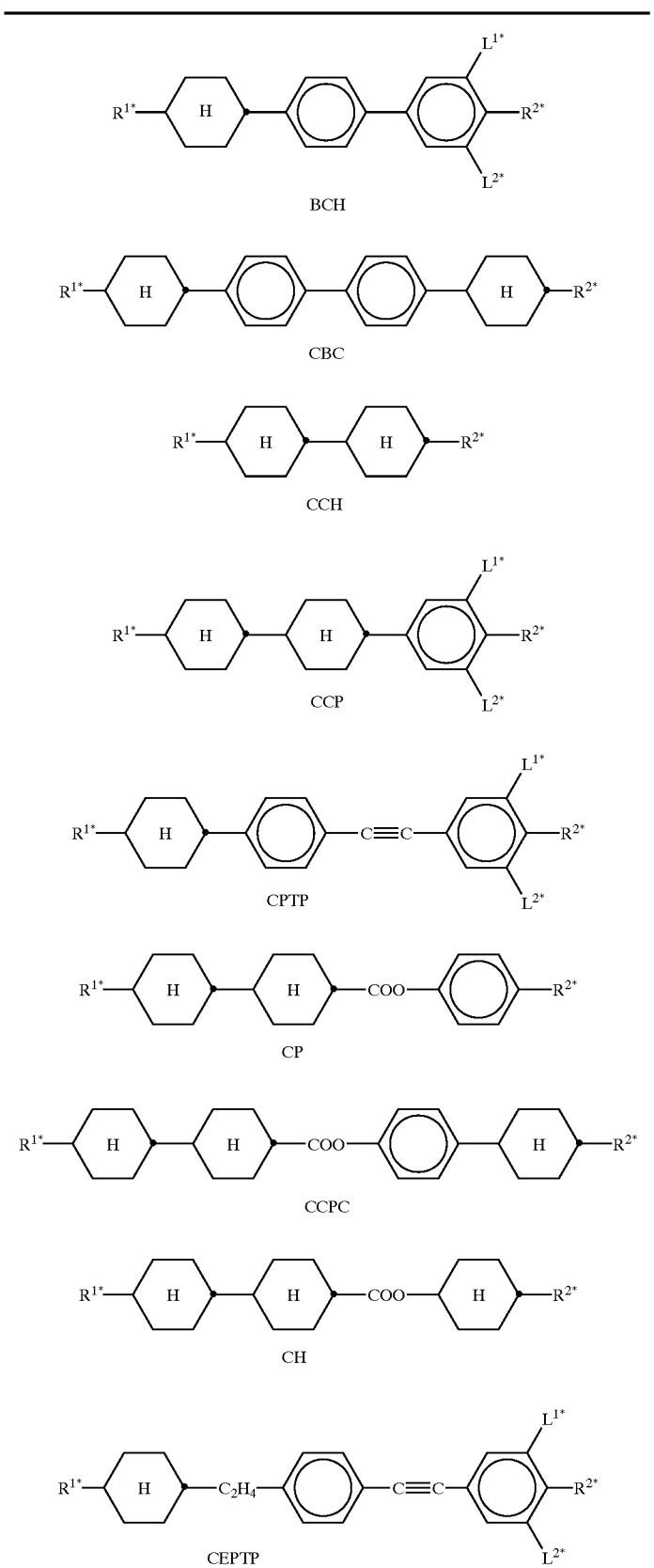

TABLE A-continued
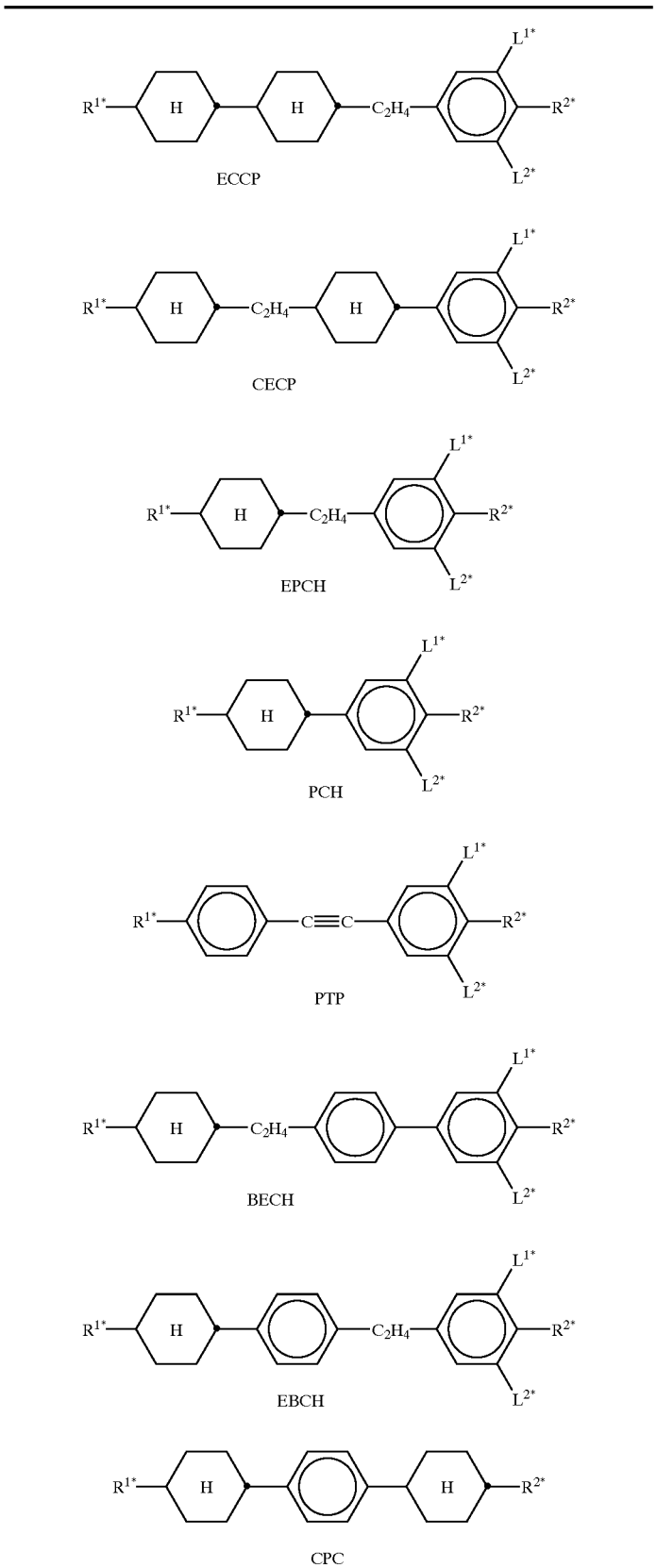

TABLE A-continued
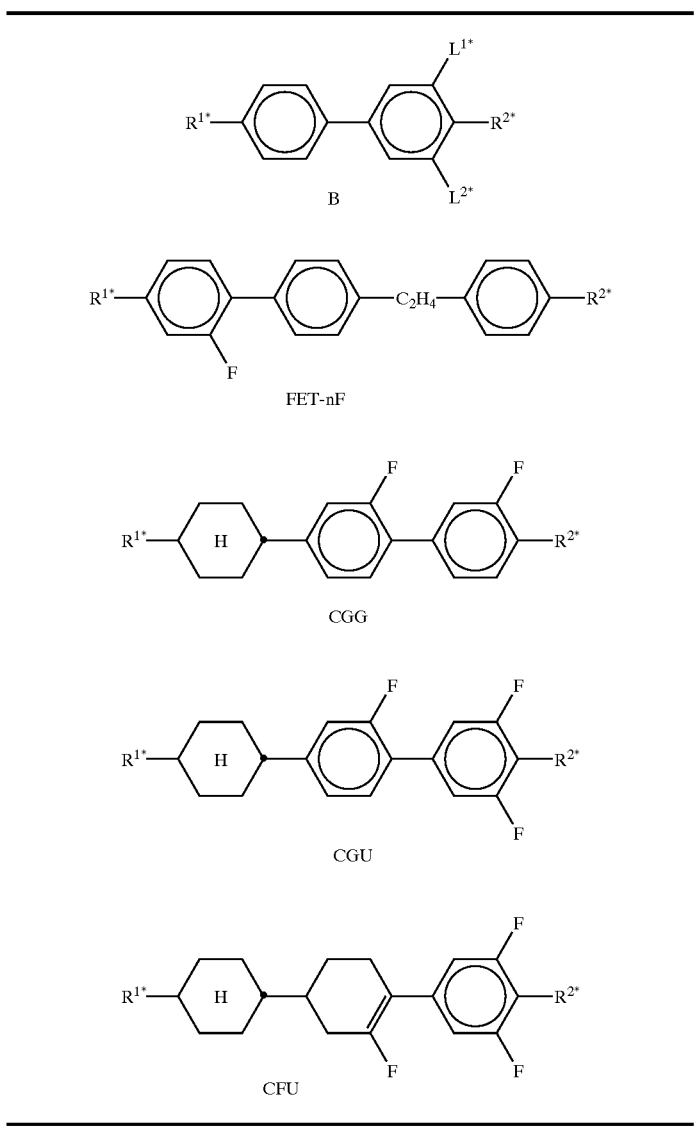
TABLE B
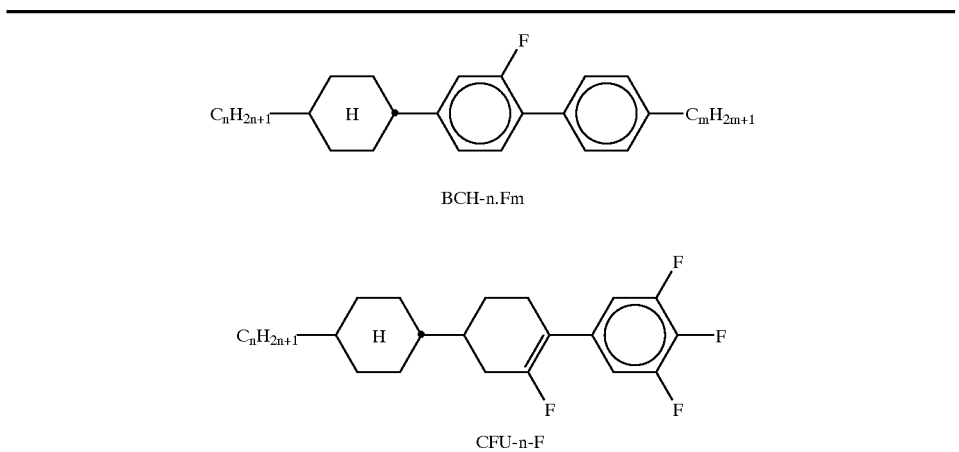

TABLE B-continued
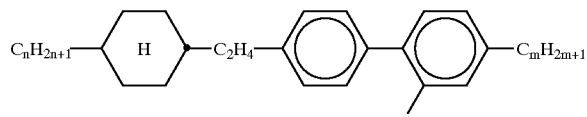
Inm
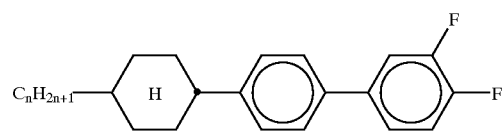
BCH-nF.F
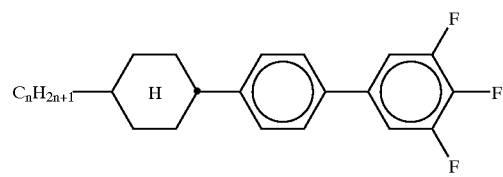
BCH-nF.F.F
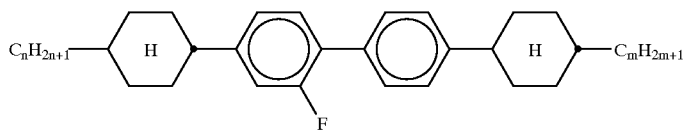
CBC-nmF
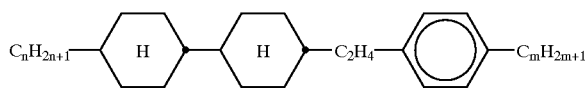
ECCP-nm
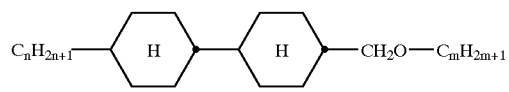
CCH-n1EM
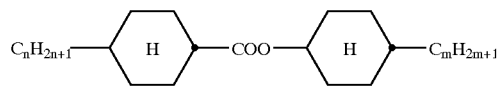
OS-nm
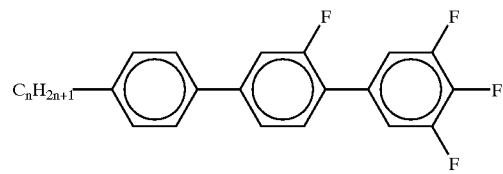
PGU-n-F
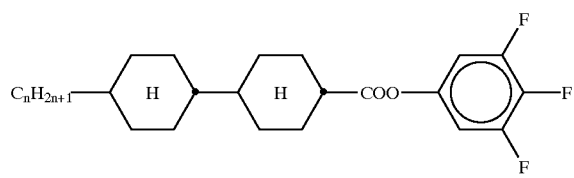
CCZU-n-F TABLE B-continued
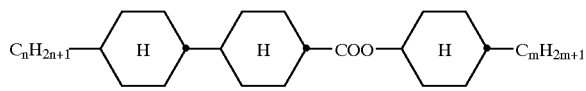
CH-nm
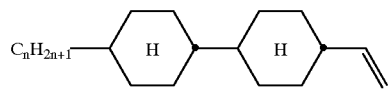
CC-n-V
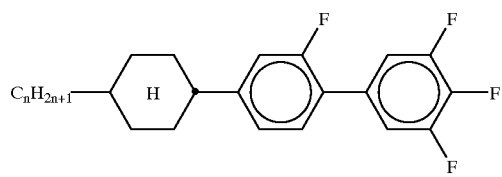
CGU-n-F
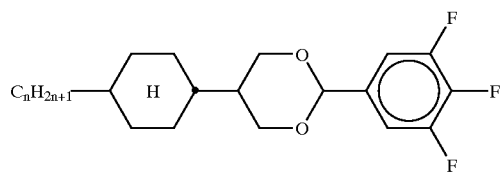
CDU-n-F
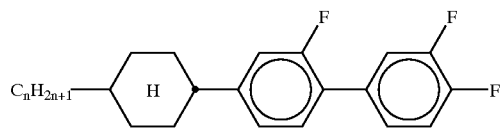
CGG-n-F
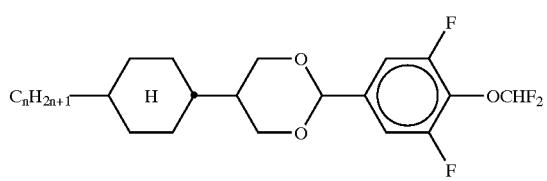
CDU-n-OD
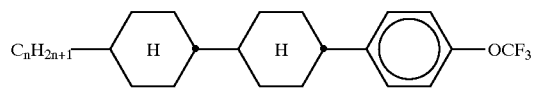
CCP-nOCF$_3$
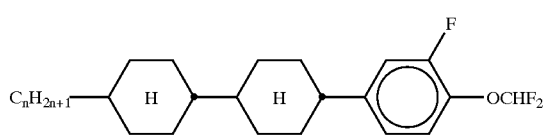
CCP-nOCF$_2$.F TABLE B-continued
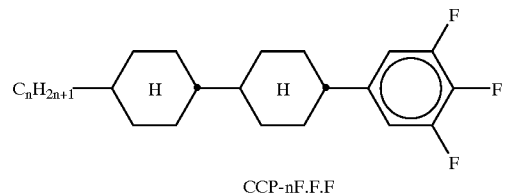
CCP-nF.F.F
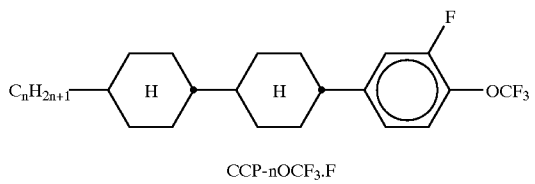
CCP-nOCF$_3$.F
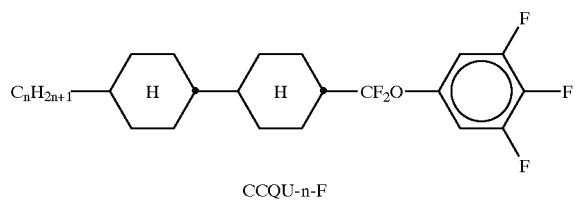
CCQU-n-F
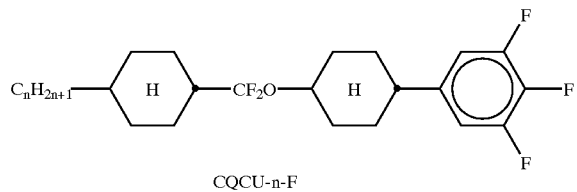
CQCU-n-F
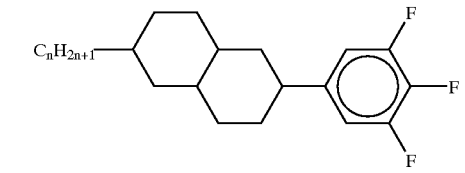
Dec-U-n-F
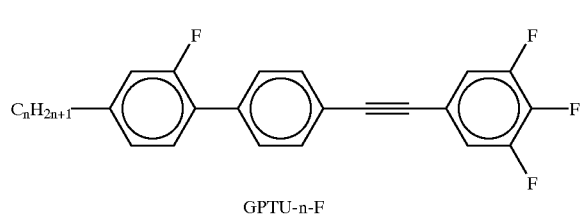
GPTU-n-F
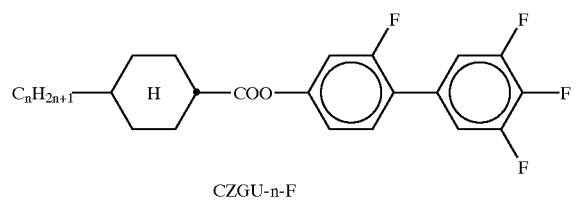
CZGU-n-F TABLE B-continued
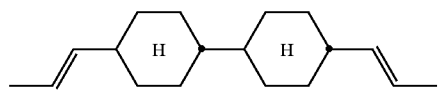
CC-1V-V1
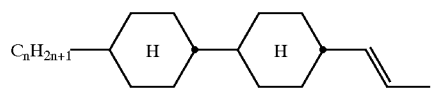
CC-n-V1
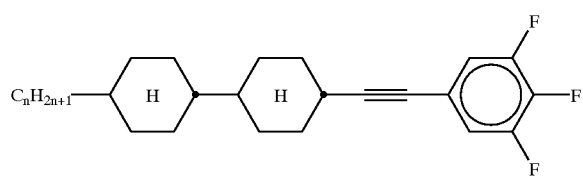
PPTU-n-F
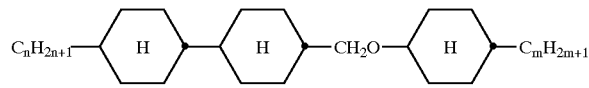
CCOC-n-m
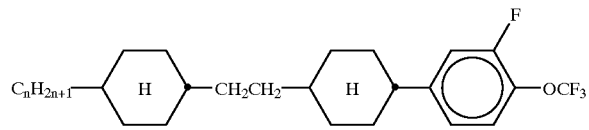
CECG-n-OT
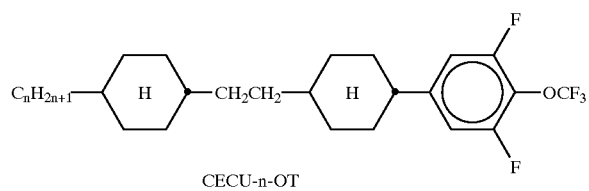
CECU-n-OT
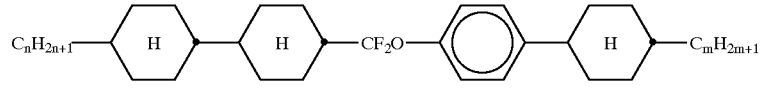
CCQPC-n-m
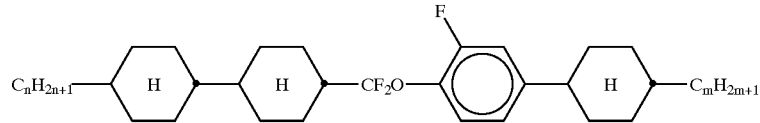
CCQGI-n-m TABLE B-continued
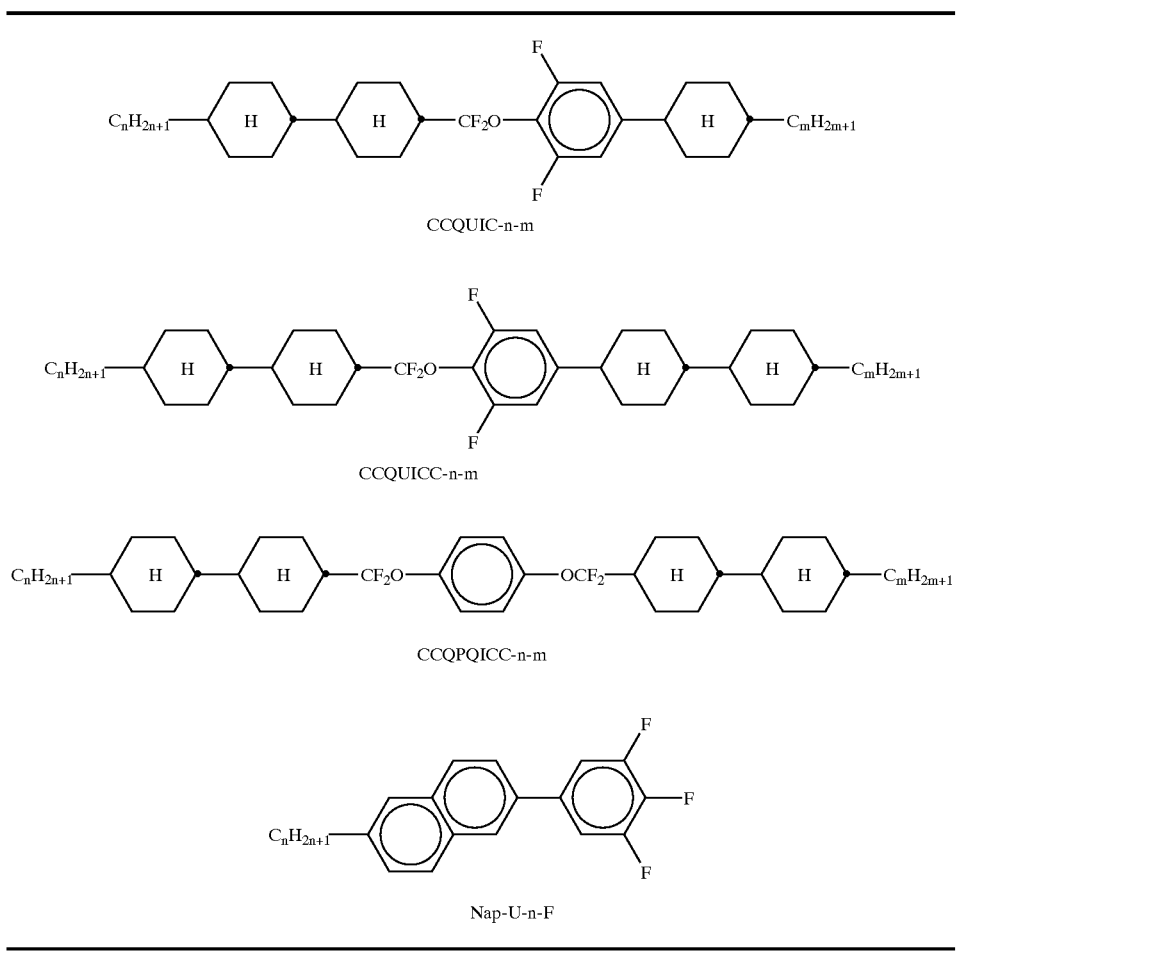
TABLE C
Table C indicates dopants which are usually employed in the liquid-crystalline mixtures.
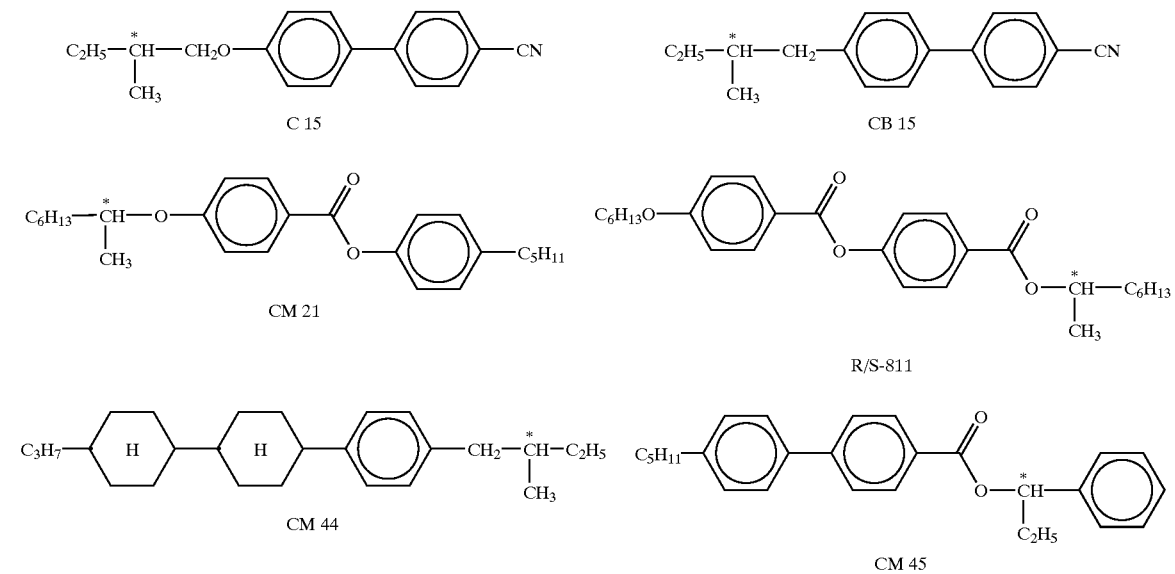

TABLE C-continued

Table C indicates dopants which are usually employed in the liquid-crystalline mixtures.

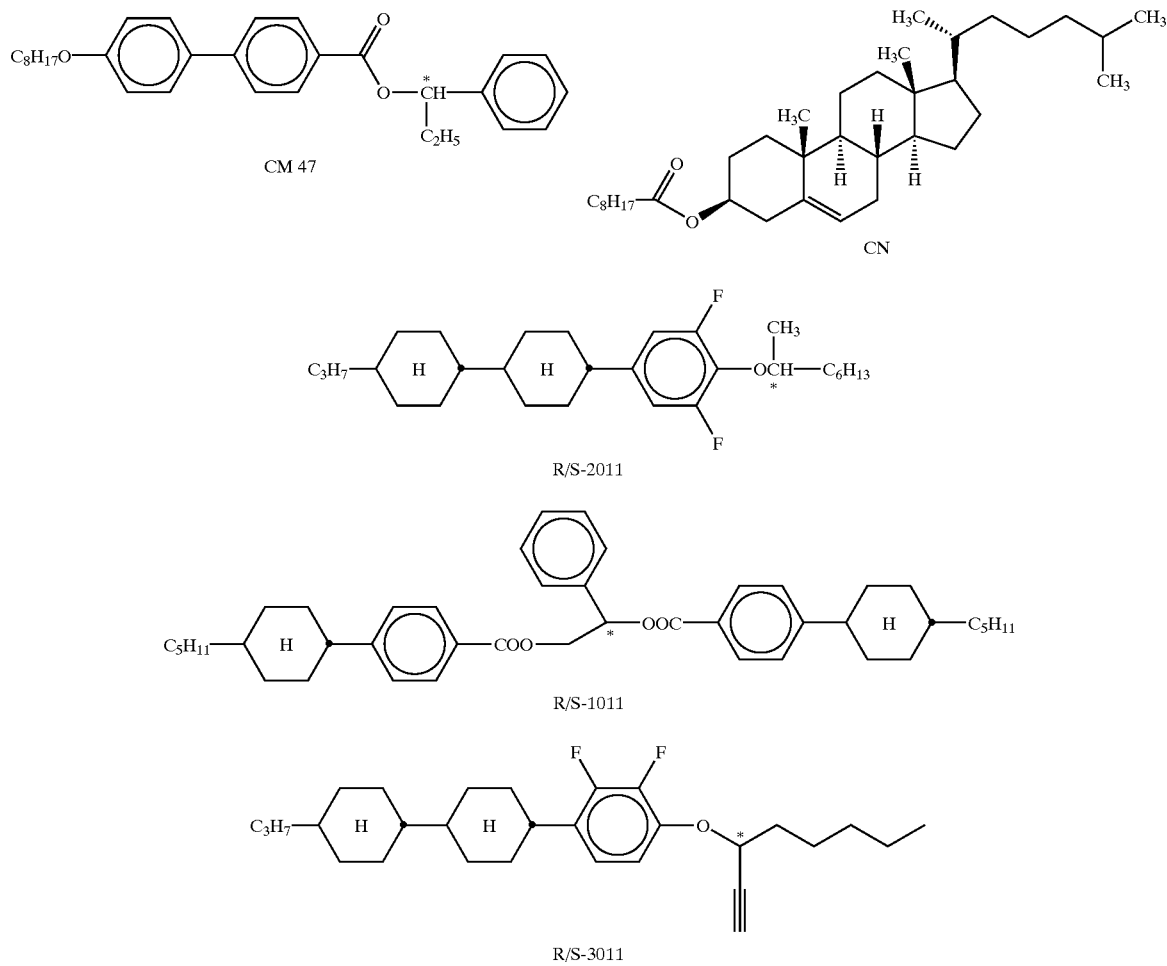

Particular preference is given to mixtures according to the invention which, besides one or more compounds of the formula I, comprise two, three or more compounds selected from Table B.

The entire disclosure of all applications, patents and publications, cited above and below, and of corresponding German Application No. 100 40 375.1, filed Aug. 8, 2000 is hereby incorporated by reference.

EXAMPLES

The examples below are intended to illustrate the invention without representing a limitation. Above and below, percentages are per cent by weight. All temperatures are given in degrees Celsius.

m.p. denotes melting point, cl.p. clearing point. Furthermore, C=crystalline state, N=nematic phase, S=smectic phase and I=isotropic phase. The numbers between these symbols are the transition temperatures. The optical anisotropy (589 nm, 20° C.) and the flow viscosity $v_{20}$(mm²/sec) and the rotational viscosity $\gamma_1$ (mPa·s) were each determined at 20° C.

$V_{10}$ denotes the voltage for 10% transmission (viewing direction perpendicular to the plate surface). $t_{on}$ denotes the switch-on time and $t_{off}$ the switch-off time at an operating voltage corresponding to twice the value of $V_{10}$. $\Delta n$ denotes the optical anisotropy, and $n_o$ the refractive index. $\Delta\epsilon$ denotes the dielectric anisotropy ($\Delta\epsilon=\epsilon_{\parallel}-\epsilon_{\perp}$, where $\epsilon_{\parallel}$ denotes the dielectric constant parallel to the longitudinal axis of the molecules, and $\epsilon_{\perp}$ denotes the dielectric constant perpendicular thereto). The electro-optical data were measured in a TN cell at the 1st minimum (i.e. at a d·$\Delta$n value of 0.5) at 20° C., unless expressly stated otherwise. The optical data were measured at 20° C., unless expressly stated otherwise.

EXAMPLES

Example 1

-continued

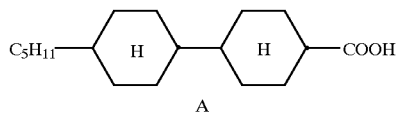

A

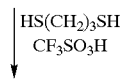

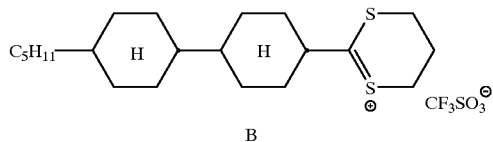

B 0.036 mol of trifluoromethanesulfonic acid is added to 0.036 mol of A and 0.036 mol of 1,3-propanedithiol with ice cooling. The mixture is subsequently heated at 120° C. for 0.5 hour. The solution is allowed to cool to room temperature, and 10 ml of acetonitrile and 50 ml of diethyl ether are added. Finally, the mixture is subjected to conventional work-up.

Step 1.2

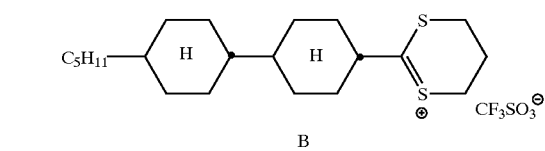

B

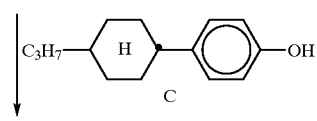

C

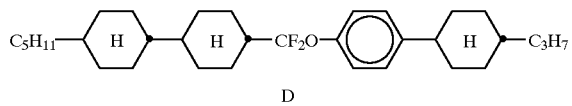

D 0.018 mol of the triflate B is initially introduced in 280 ml of dichloromethane at −70° C., and a mixture consisting of 0.037 mol of triethylamine and 0.036 mol of C in 20 ml of dichloromethane is added. The mixture is stirred at −70° C. for 2 hours, 0.180 mol of triethylamine trishydrofluoride is added, the mixture is stirred for a further 5 minutes, and then 0.075 mol of 1,3-dibromo-5,5-dimethylhydantoin is added in portions. The mixture is stirred at −70° C. for a further 1.5 hours. It is subsequently allowed to warm to room temperature. The yellow solution is treated with saturated sodium hydrogen carbonate solution. Finally, the mixture is subjected to conventional work-up. The residue is recrystallized from n-heptane.

C 28 $S_{B(C)}$ 195 $S_{B(H)}$ 201 N 260.3 I; $\Delta\epsilon$=1.3; $\Delta n$=0.0975

The following compounds of the formula

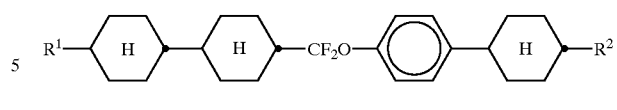

are prepared analogously:

| $R^1$ | $R^2$ | |
|---|---|---|
| $CH_3$ | $CH_3$ | |
| $CH_3$ | $C_2H_5$ | |
| $CH_3$ | n-$C_3H_7$ | |
| $CH_3$ | n-$C_4H_9$ | |
| $CH_3$ | n-$C_5H_{11}$ | |
| $CH_3$ | n-$C_6H_{13}$ | |
| $C_2H_5$ | $CH_3$ | |
| $C_2H_5$ | $C_2H_5$ | C49 $S_8$ 132 N 255.7 I; $\Delta\epsilon$ = +1.3; $\Delta n$ = 0.0985 |
| $C_2H_5$ | n-$C_3H_7$ | C59 $S_7$ 102 $S_8$ 142 N 270.6 i; $\Delta\epsilon$ = +1.5; $\Delta n$ = 0.1075 |
| $C_2H_5$ | n-$C_4H_9$ | |
| $C_2H_5$ | n-$C_5H_{11}$ | |
| $C_2H_5$ | n-$C_6H_{13}$ | |
| n-$C_3H_7$ | $CH_3$ | |
| n-$C_3H_7$ | $C_2H_5$ | C36 $S_8$ 164 N 271.0 I; $\Delta\epsilon$ = +1.5; $\Delta n$ = 0.1065 |
| n-$C_3H_7$ | n-$C_3H_7$ | C81 $S_7$ 169 N 285.7 I; $\Delta\epsilon$ = +1.9; $\Delta n$ = 0.1105 |
| n-$C_3H_7$ | n-$C_4H_9$ | |
| n-$C_3H_7$ | n-$C_5H_{11}$ | |
| n-$C_3H_7$ | n-$C_6H_{13}$ | |
| n-$C_4H_9$ | $CH_3$ | |
| n-$C_4H_9$ | $C_2H_5$ | |
| n-$C_4H_9$ | n-$C_3H_7$ | |
| n-$C_4H_9$ | n-$C_4H_9$ | |
| n-$C_4H_9$ | n-$C_5H_{11}$ | |
| n-$C_4H_9$ | n-$C_6H_{13}$ | |
| n-$C_5H_{11}$ | $CH_3$ | |
| n-$C_5H_{11}$ | $C_2H_5$ | |
| n-$C_5H_{11}$ | n-$C_4H_9$ | |
| n-$C_5H_{11}$ | n-$C_5H_{11}$ | |
| n-$C_5H_{11}$ | n-$C_6H_{13}$ | |
| n-$C_6H_{13}$ | $CH_3$ | |
| n-$C_6H_{13}$ | $C_2H_5$ | |
| n-$C_6H_{13}$ | n-$C_3H_7$ | |
| n-$C_6H_{13}$ | n-$C_4H_9$ | |
| n-$C_6H_{13}$ | n-$C_5H_{11}$ | |
| n-$C_6H_{13}$ | n-$C_6H_{13}$ | |
| $CH_2$=CH | $CH_3$ | |
| $CH_2$=CH | $C_2H_5$ | |
| $CH_2$=CH | n-$C_3H_7$ | |
| $CH_2$=CH | n-$C_4H_9$ | |
| $CH_2$=CH | n-$C_5H_{11}$ | |
| $CH_2$=CH | n-$C_6H_{13}$ | |
| $CH_3$ | $CH_2$=CH | |
| $C_2H_5$ | $CH_2$=CH | |
| n-$C_3H_7$ | $CH_2$=CH | |
| n-$C_4H_9$ | $CH_2$=CH | |
| n-$C_5H_{11}$ | $CH_2$=CH | |
| n-$C_6H_{13}$ | $CH_2$=CH | |
| $CH_3CH$=CH | $CH_3$ | |
| $CH_3CH$=CH | $C_2H_5$ | |
| $CH_3CH$=CH | n-$C_3H_7$ | |
| $CH_3CH$=CH | n-$C_4H_9$ | |
| $CH_3CH$=CH | n-$C_5H_{11}$ | |
| $CH_3CH$=CH | n-$C_6H_{13}$ | |
| $CH_2$=CH-$C_2H_4$ | $CH_3$ | |
| $CH_2$=CH-$C_2H_4$ | $C_2H_5$ | |
| $CH_2$=CH-$C_2H_4$ | n-$C_3H_7$ | |
| $CH_2$=CH-$C_2H_4$ | n-$C_4H_9$ | |
| $CH_2$=CH-$C_2H_4$ | n-$C_5H_9$ | |
| $CH_2$=CH-$C_2H_4$ | n-$C_6H_9$ | |

Example 2

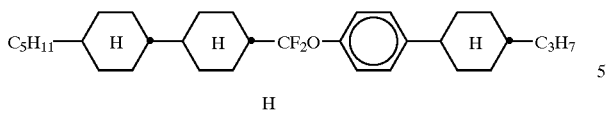

Step 2.1

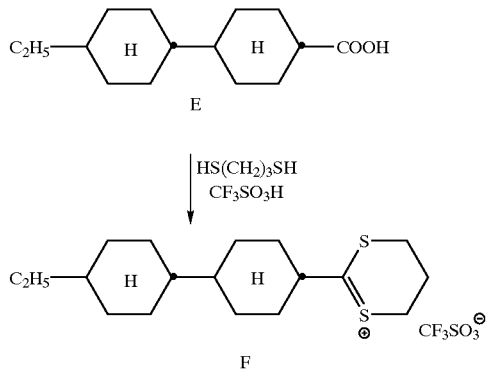

3.0 mol of trifluoromethanesulfonic acid are added to 0.1 mol of E and 0.1 mol of 1,3-propanedithiol with ice cooling. The mixture is subsequently heated at 120° C. for 75 minutes. The solution is allowed to cool to room temperature, and 750 ml of diethyl ether are added. The solution is cooled at −20° C. for 12 hours and filtered with suction under nitrogen. The moist filter cake is dissolved in 700 ml of diethyl ether and 200 ml of acetonitrile at elevated temperature and cooled to −20° C. overnight. The crystals are filtered off with suction, washed with diethyl ether and dried under reduced pressure.

Step 2.2

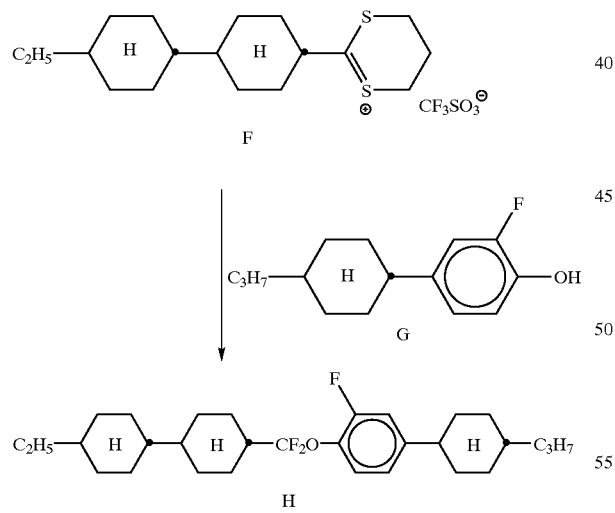

0.02 mol of the triflate F is initially introduced in 280 ml of dichloromethane at −70° C., and a mixture consisting of 0.036 mol of triethylamine and 0.03 mol of G in 20 ml of dichloromethane is added. The mixture is stirred at −70° C. for 2 hours, 0.10 mol of triethylamine trishydrofluoride is added, the mixture is stirred for a further 5 minutes, and then 0.10 mol of N-bromosuccinimide is added in portions. The mixture is stirred at −70° C. for a further 1.5 hours. It is subsequently allowed to warm to room temperature. The yellow solution is treated with sodium hydroxide solution. Finally, the mixture is subjected to conventional work-up. The residue is recrystallized from n-heptane.

C 65 S$_?$ 92 N 268.7 I; Δε=1.1; Δn=0.1035

The following compounds of the formula

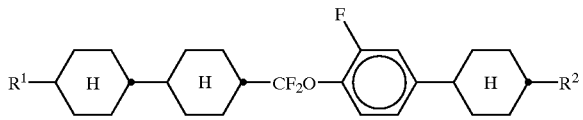

are prepared analogously:

| R$^1$ | R$^2$ |
|---|---|
| CH$_3$ | CH$_3$ |
| CH$_3$ | C$_2$H$_5$ |
| CH$_3$ | n-C$_3$H$_7$ |
| CH$_3$ | n-C$_4$H$_9$ |
| CH$_3$ | n-C$_5$H$_{11}$ |
| CH$_3$ | n-C$_6$H$_{13}$ |
| C$_2$H$_5$ | CH$_3$ |
| C$_2$H$_5$ | C$_2$H$_5$ |
| C$_2$H$_5$ | n-C$_4$H$_9$ |
| C$_2$H$_5$ | n-C$_5$H$_{11}$ |
| C$_2$H$_5$ | n-C$_6$H$_{13}$ |
| n-C$_3$H$_7$ | CH$_3$ |
| n-C$_3$H$_7$ | C$_2$H$_5$ |
| n-C$_3$H$_7$ | n-C$_3$H$_7$ |
| n-C$_3$H$_7$ | n-C$_4$H$_9$ |
| n-C$_3$H$_7$ | n-C$_5$H$_{11}$ |
| n-C$_3$H$_7$ | n-C$_6$H$_{13}$ |
| n-C$_4$H$_9$ | CH$_3$ |
| n-C$_4$H$_9$ | C$_2$H$_5$ |
| n-C$_4$H$_9$ | n-C$_3$H$_7$ |
| n-C$_4$H$_9$ | n-C$_4$H$_9$ |
| n-C$_4$H$_9$ | n-C$_5$H$_{11}$ |
| n-C$_4$H$_9$ | n-C$_6$H$_{13}$ |
| n-C$_5$H$_{11}$ | CH$_3$ |
| n-C$_5$H$_{11}$ | C$_2$H$_5$ |
| n-C$_5$H$_{11}$ | n-C$_3$H$_7$ |
| n-C$_5$H$_{11}$ | n-C$_4$H$_9$ |
| n-C$_5$H$_{11}$ | n-C$_5$H$_{11}$ |
| n-C$_5$H$_{11}$ | n-C$_6$H$_{13}$ |
| n-C$_6$H$_{13}$ | CH$_3$ |
| n-C$_6$H$_{13}$ | C$_2$H$_5$ |
| n-C$_6$H$_{13}$ | n-C$_3$H$_7$ |
| n-C$_6$H$_{13}$ | n-C$_4$H$_9$ |
| n-C$_6$H$_{13}$ | n-C$_5$H$_{11}$ |
| n-C$_6$H$_{13}$ | n-C$_6$H$_{13}$ |
| CH$_2$=CH | CH$_3$ |
| CH$_2$=CH | C$_2$H$_5$ |
| CH$_2$=CH | n-C$_3$H$_7$ |
| CH$_2$=CH | n-C$_4$H$_9$ |
| CH$_2$=CH | n-C$_5$H$_{11}$ |
| CH$_2$=CH | n-C$_6$H$_{13}$ |
| CH$_3$ | CH$_2$=CH |
| C$_2$H$_5$ | CH$_2$=CH |
| n-C$_3$H$_7$ | CH$_2$=CH |
| n-C$_4$H$_9$ | CH$_2$=CH |
| n-C$_5$H$_{11}$ | CH$_2$=CH |
| n-C$_6$H$_{13}$ | CH$_2$=CH |
| CH$_3$CH=CH | CH$_3$ |
| CH$_3$CH=CH | C$_2$H$_5$ |
| CH$_3$CH=CH | n-C$_3$H$_7$ |
| CH$_3$CH=CH | n-C$_4$H$_9$ |
| CH$_3$CH=CH | n-C$_5$H$_{11}$ |
| CH$_3$CH=CH | n-C$_6$H$_{13}$ |

Example 3

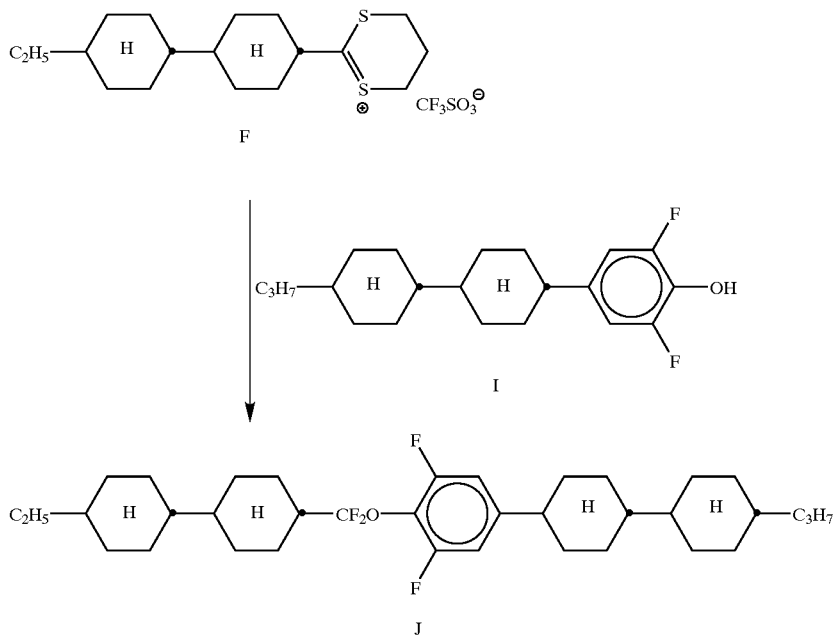

0.02 mol of the triflate F (from step 2.1, Example 2) is initially introduced in 280 ml of dichloromethane at −70° C., and a mixture consisting of 0.036 mol of triethylamine and 0.03 mol of I in 20 ml of dichloromethane is added. The mixture is stirred at −70° C. for 2 hours, 0.10 mol of triethylamine trishydrofluoride is added, the mixture is stirred for a further 5 minutes, and then 0.10 mol of N-bromosuccinimide is added in portions. The mixture is stirred at −70° C. for a further 1.5 hours. It is subsequently allowed to warm to room temperature. The yellow solution is treated with sodium hydroxide solution. Finally, the mixture is subjected to conventional work-up. The residue is recrystallized from n-heptane.

C 134 $S_B$ 215 N>350 I; $\Delta\epsilon$=2.1; $\Delta n$=0.1145

The following compounds of the formula

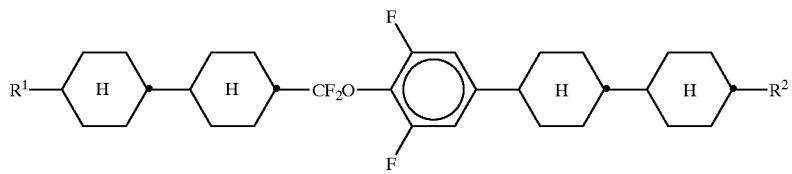

are prepared analogously:

| $R^1$ | $R^2$ |
|---|---|
| $CH_3$ | $CH_3$ |
| $CH_3$ | $C_2H_5$ |
| $CH_3$ | $n\text{-}C_3H_7$ |
| $CH_3$ | $n\text{-}C_4H_5$ |
| $CH_3$ | $n\text{-}C_5H_{11}$ |
| $CH_3$ | $n\text{-}C_6H_{13}$ |
| $C_2H_5$ | $CH_3$ |// -continued
| $R^1$ | $R^2$ |
|---|---|
| $C_2H_5$ | $C_2H_5$ |
| $C_2H_5$ | $n\text{-}C_4H_5$ |
| $C_2H_5$ | $n\text{-}C_5H_{11}$ |
| $C_2H_5$ | $n\text{-}C_6H_{13}$ |
| $n\text{-}C_3H_7$ | $CH_3$ |
| $n\text{-}C_3H_7$ | $C_2H_5$ |
| $n\text{-}C_3H_7$ | $n\text{-}C_3H_7$ |
| $n\text{-}C_3H_7$ | $n\text{-}C_4H_9$ |
| $n\text{-}C_3H_7$ | $n\text{-}C_5H_{11}$ |
| $n\text{-}C_3H_7$ | $n\text{-}C_6H_{13}$ |
| $n\text{-}C_4H_9$ | $CH_3$ |
| $n\text{-}C_4H_9$ | $C_2H_5$ |

-continued

| $R^1$ | $R^2$ |
|---|---|
| $n\text{-}C_4H_9$ | $n\text{-}C_3H_7$ |
| $n\text{-}C_4H_9$ | $n\text{-}C_4H_9$ |
| $n\text{-}C_4H_9$ | $n\text{-}C_5H_{11}$ |
| $n\text{-}C_4H_9$ | $n\text{-}C_6H_{13}$ |
| $n\text{-}C_5H_{11}$ | $CH_3$ |
| $n\text{-}C_5H_{11}$ | $C_2H_5$ |
| $n\text{-}C_5H_{11}$ | $n\text{-}C_3H_7$ |
| $n\text{-}C_5H_{11}$ | $n\text{-}C_4H_9$ |

-continued

| R¹ | R² |
|---|---|
| n-C$_5$H$_{11}$ | n-C$_5$H$_{11}$ |
| n-C$_5$H$_{11}$ | n-C$_6$H$_{13}$ |
| n-C$_6$H$_{13}$ | CH$_3$ |
| n-C$_6$H$_{13}$ | C$_2$H$_5$ |
| n-C$_6$H$_{13}$ | n-C$_3$H$_7$ |
| n-C$_6$H$_{13}$ | n-C$_4$H$_9$ |
| n-C$_6$H$_{13}$ | n-C$_5$H$_{11}$ |
| n-C$_6$H$_{13}$ | n-C$_6$H$_{13}$ |
| CH$_2$=CH | CH$_3$ |
| CH$_2$=CH | C$_2$H$_5$ |
| CH$_2$=CH | n-C$_3$H$_7$ |
| CH$_2$=CH | n-C$_4$H$_9$ |
| CH$_2$=CH | n-C$_5$H$_{11}$ |
| CH$_2$=CH | n-C$_6$H$_{13}$ |
| CH$_3$ | CH$_2$=CH |
| C$_2$H$_5$ | CH$_2$=CH |
| n-C$_3$H$_7$ | CH$_2$=CH |
| n-C$_4$H$_9$ | CH$_2$=CH |
| n-C$_5$H$_{11}$ | CH$_2$=CH |
| n-C$_6$H$_{13}$ | CH$_2$=CH |
| CH$_3$CH=CH | CH$_3$ |
| CH$_3$CH=CH | C$_2$H$_5$ |
| CH$_3$CH=CH | n-C$_3$H$_7$ |
| CH$_3$CH=CH | n-C$_4$H$_9$ |
| CH$_3$CH=CH | n-C$_5$H$_{11}$ |
| CH$_3$CH=CH | n-C$_6$H$_{13}$ |

Example 4

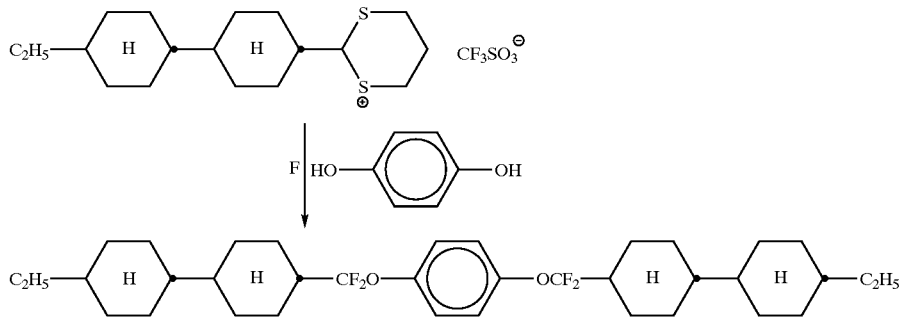

0.1 mol of F is initially introduced in 600 ml of dichloromethane at −70° C., and a solution consisting of 0.05 mol of triethylamine and 0.04 mol of hydroquinone in 100 ml of dichloromethane is added. The mixture is stirred at −70° C. for 1 hour, 0.412 mol of HF (50% solution in pyridine) is added, the mixture is stirred for a further 15 minutes, and then 0.2 mol of N-bromosuccinimide is added. After the reaction mixture has been stirred for 90 minutes, it is allowed to warm to room temperature, and dilute sodium hydroxide solution is added. The organic phase is separated off and subjected to conventional work-up. The product is recrystallized from n-heptane.

C 140 S$_?$ 150 S$_B$ 169 N>325 I; Δε=0.2; Δn=0.1093

The following compounds of the formula

are prepared analogously:

| R¹ | R² |
|---|---|
| CH$_3$ | CH$_3$ |
| n-C$_3$H$_7$ | n-C$_3$H$_7$ |
| n-C$_4$H$_9$ | n-C$_4$H$_9$ |
| n-C$_5$H$_{11}$ | n-C$_5$H$_{11}$ |
| n-C$_6$H$_{13}$ | n-C$_6$H$_{13}$ |
| CH$_2$=CH | CH$_2$=CH |
| CH$_3$CH=CH | CH=CH—CH$_3$ |
| CH$_2$=CHCH$_2$CH$_2$ | CH$_2$CH$_2$CH=CH$_2$ |

Mixture Examples

Example M1

| CCH-301 | 10.00% | S → N [° C.]: <−40 |
|---|---|---|
| CCH-501 | 14.00% | Clearing point [° C.]: 102.0 |
| CCP-2F.F.F | 10.00% | Δn [589 nm, 20° C.]: 0.0658 |
| CCP-3F.F.F | 11.00% | Δε [1 kHz, 20° C.]: 6.1 |
| CCP-5F.F.F | 5.00% | Voltage holding ratio [%]: 98.9 |
| CCZU-2-F | 4.00% | γ$_1$ [mPa.s, 20° C.]: 162 |
| CCZU-3-F | 15.00% | V$_{10,0,20}$ [V]: 1.86 |

-continued

| CCZU-5-F | 4.00% |
|---|---|
| CCP-2OCF$_3$.F | 6.00% |
| CCQPC-2-2 | 3.00% |
| CCQPC-2-3 | 4.00% |
| CCQPC-5-3 | 4.00% |
| CCOC-3-3 | 3.00% |
| CCOC-4-3 | 4.00% |
| CCOC-3-5 | 3.00% |

Example M2

| | | | |
|---|---|---|---|
| CCH-301 | 16.00% | S → N [° C.]: | <−30 |
| CCH-501 | 18.00% | Clearing point [° C.]: | 100.5 |
| CCP-2F.F.F | 9.00% | Δn [589 nm, 20° C.]: | 0.0611 |
| CCP-3F.F.F | 5.00% | Δε [1 kHz, 20° C.]: | 4.3 |
| CCP-5F.F.F | 5.00% | Voltage holding ratio [%]: | 99.1 |
| CCZU-2-F | 4.00% | $\gamma_1$ [mPa.s, 20° C.]: | 149 |
| CCZU-3-F | 13.00% | $V_{10,0,20}$ [V]: | 2.21 |
| CCZU-5-F | 4.00% | | |
| CCQPC-2-2 | 3.00% | | |
| CCQPC-2-3 | 4.00% | | |
| CCQPC-5-3 | 5.00% | | |
| CCOC-3-3 | 3.00% | | |
| CCOC-4-3 | 4.00% | | |
| CCOC-3-5 | 3.00% | | |
| CH-43 | 2.00% | | |
| CH-45 | 2.00% | | |

Example 3

| | | | |
|---|---|---|---|
| CCH-301 | 14.00% | Clearing point [° C.]: | 104.5 |
| CCH-501 | 18.00% | Δn [589 nm, 20° C.]: | 0.0618 |
| CCP-2F.F.F | 8.00% | $\gamma_1$ [mPa.s, 20° C.]: | 159 |
| CCP-3F.F.F | 5.00% | $V_{10,0,20}$ [V]: | 2.23 |
| CCP-5F.F.F | 5.00% | | |
| CCZU-2-F | 4.00% | | |
| CCZU-3-F | 14.00% | | |
| CCZU-5-F | 4.00% | | |
| CCQPC-2-2 | 3.00% | | |
| CCQPC-2-3 | 4.00% | | |
| CCQPC-5-3 | 5.00% | | |
| CCOC-3-3 | 3.00% | | |
| CCOC-4-3 | 4.00% | | |
| CCOC-3-5 | 3.00% | | |
| CH-35 | 2.00% | | |
| CH-43 | 2.00% | | |
| CH-45 | 2.00% | | |

Example M4

| | | | |
|---|---|---|---|
| BCH-3F.F | 10.80% | Clearing point [° C.]: | 109.3° C. |
| BCH-5F.F | 9.00% | Δn [589 nm, 20° C.]: | 0.0967 |
| ECCP-30CF$_3$ | 4.50% | Δε [1 kHz, 20° C.]: | 4.9 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| CCQPC-2-2 | 10.00% | | |

Example M5

| | | | |
|---|---|---|---|
| BCH-3F.F | 10.80% | Clearing point [° C.]: | 111.1° C. |
| BCH-5F.F | 9.00% | Δn [589 nm, 20° C.]: | 0.0976 |
| ECCP-30CF$_3$ | 4.50% | Δε [1 kHz, 20° C.]: | 4.9 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| CCQPC-2-3 | 9.98% | | |

Example M6

| | | | |
|---|---|---|---|
| BCH-3F.F | 10.80% | Clearing point [° C.]: | 112.7° C. |
| BCH-5F.F | 9.00% | Δn [589 nm, 20° C.]: | 0.0979 |
| ECCP-30CF$_3$ | 4.50% | Δε [1 kHz, 20° C.]: | 4.9 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| CCQPC-3-3 | 9.98% | | |

Example M7

| | | | |
|---|---|---|---|
| BCH-3F.F | 10.80% | Clearing point [° C.]: | 111.0° C. |
| BCH-5F.F | 9.00% | Δn [589 nm, 20° C.]: | 0.0975 |
| ECCP-30CF$_3$ | 4.50% | Δε [1 kHz, 20° C.]: | 4.9 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| CCQPC-3-2 | 10.00% | | |

Example M8

| | | | |
|---|---|---|---|
| BCH-3F.F | 10.31% | Clearing point [° C.]: | 110.1° C. |
| BCH-5F.F | 9.01% | Δn [589 nm, 20° C.]: | 0.0966 |
| ECCP-30CF$_3$ | 4.51% | Δε [1 kHz, 20° C.]: | 4.9 |
| ECCP-50CF$_3$ | 4.51% | | |
| CBC-33F | 1.80% | | |
| CBC-53F | 1.80% | | |
| CBC-55F | 1.80% | | |
| PCH-6F | 7.21% | | |
| PCH-7F | 5.41% | | |
| CCP-20CF$_3$ | 7.21% | | |
| CCP-30CF$_3$ | 10.81% | | |
| CCP-40CF$_3$ | 6.31% | | |
| CCP-50CF$_3$ | 9.91% | | |
| PCH-5F | 9.01% | | |
| CCQPC-5-3 | 9.90% | | |

Example M9

| | | |
|---|---|---|
| CCH-301 | 11.18% | Clearing point [° C.]: 119.8° C. |
| CCH-501 | 8.79% | Δε [1 kHz, 20° C.]: 5.3 |
| CCP-2F.F.F | 7.99% | |
| CCP-3F.F.F | 10.38% | |
| CCP-5F.F.F | 3.99% | |
| CCZU-2-F | 3.99% | |
| CCZU-3-F | 13.58% | |
| CCZU-5-F | 3.99% | |
| CH-33 | 2.40% | |
| CH-35 | 2.40% | |
| CH-43 | 2.40% | |
| CCPC-33 | 2.40% | |
| CCH-3CF$_3$ | 6.39% | |
| CCQPC-5-3 | 20.12% | |

Example M10

| | | |
|---|---|---|
| BCH-3F.F | 11.40% | Clearing point [° C.]: 104.7° C. |
| BCH-5F.F | 9.50% | Δn [589 nm, 20° C.]: 0.0974 |
| ECCP-30CF$_3$ | 4.75% | Δε [1 kHz, 20° C.]: 5.1 |
| ECCP-50CF$_3$ | 4.75% | |
| CBC-33F | 1.90% | |
| CBC-53F | 1.90% | |
| CBC-55F | 1.90% | |
| PCH-6F | 7.60% | |
| PCH-7F | 5.70% | |
| CCP-20CF$_3$ | 7.60% | |
| CCP-30CF$_3$ | 11.40% | |
| CCP-40CF$_3$ | 6.65% | |
| CCP-50CF$_3$ | 10.45% | |
| PCH-5F | 9.50% | |
| CCQU1CC-2-3 | 4.99% | |

Example M11

| | | |
|---|---|---|
| BCH-3F.F | 10.80% | Clearing point [° C.]: 108.8° C. |
| BCH-5F.F | 9.00% | Δn [589 nm, 20° C.]: 0.0972 |
| ECCP-30CF$_3$ | 4.50% | Δε [1 kHz, 20° C.]: 4.9 |
| ECCP-50CF$_3$ | 4.50% | |
| CBC-33F | 1.80% | |
| CBC-53F | 1.80% | |
| CBC-55F | 1.80% | |
| PCH-6F | 7.20% | |
| PCH-7F | 5.40% | |
| CCP-20CF$_3$ | 7.20% | |
| CCP-30CF$_3$ | 10.80% | |
| CCP-40CF$_3$ | 6.30% | |
| CCP-50CF$_3$ | 9.90% | |
| PCH-5F | 9.00% | |
| CCQGIC-2-3 | 10.00% | |

Example M12

| | | |
|---|---|---|
| BCH-3F.F | 10.78% | Clearing point [° C.]: 116.7° C. |
| BCH-5F.F | 8.98% | Δn [589 nm, 20° C.]: 0.0978 |
| ECCP-30CF$_3$ | 4.49% | Δε [1 kHz, 20° C.]: 4.8 |
| ECCP-50CF$_3$ | 4.49% | |
| CBC-33F | 1.80% | |
| CBC-53F | 1.80% | |
| CBC-55F | 1.80% | |
| PCH-6F | 7.19% | |
| PCH-7F | 5.39% | |
| CCP-20CF$_3$ | 7.19% | |

-continued

| | |
|---|---|
| CCP-30CF$_3$ | 10.78% |
| CCP-40CF$_3$ | 6.29% |
| CCP-50CF$_3$ | 9.88% |
| PCH-5F | 8.98% |
| CCQPICC-2-2 | 10.18% |

Example M13

| | | |
|---|---|---|
| BCH-3F.F | 11.37% | Clearing point [° C.]: 105.6° C. |
| BCH-5F.F | 9.47% | |
| ECCP-30CF$_2$ | 4.74% | |
| ECCP-50CF$_3$ | 4.74% | |
| CBC-33F | 1.89% | |
| CBC-53F | 1.89% | |
| CBC-55F | 1.89% | |
| PCH-6F | 7.58% | |
| PCH-7F | 5.68% | |
| CCP-20CF$_3$ | 7.58% | |
| CCP-30CF$_3$ | 11.37% | |
| CCP-40CF$_3$ | 6.63% | |
| CCP-50CF$_3$ | 10.42% | |
| PCH-5F | 9.47% | |
| CCQPQICC-2-2 | 5.26% | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A tetracyclic or pentacyclic compound of the formula I

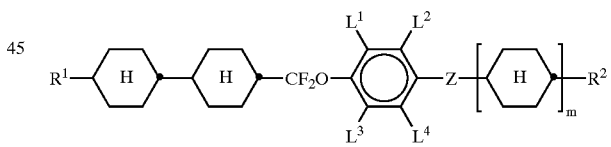

wherein

R$^1$ and R$^2$ are each, independently of one another, an alkyl or alkenyl radical having 1 to 15 carbon atoms which is unsubstituted, monosubstituted by CN or CF$_3$, or monosubstituted to perhalosubstituted by halogen, wherein one or more CH$_2$ groups in these radicals are optionally, in each case independently of one another, replaced by —O—, —S—,

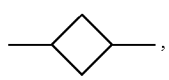

—CO—, —CO—O—, —O—CO— or —O—CO—O— such that the O atoms are not linked directly to one another, Z is —OCF$_2$—, —CF$_2$O— or a single bond, $L^1$, $L^2$, $L^3$ and $L^4$ are each, independently of one another, H or F, and,
m is 1 or 2.
2. A tetracyclic or pentacyclic compound according to claim 1, wherein $R^1$ and $R^2$ are each, independently of one another, a straight-chain alkyl or alkenyl radical having 1 to 8 carbon atoms.
3. A tetracyclic or pentacyclic compound of claim 1, which is of the formulae Ia to Ij,
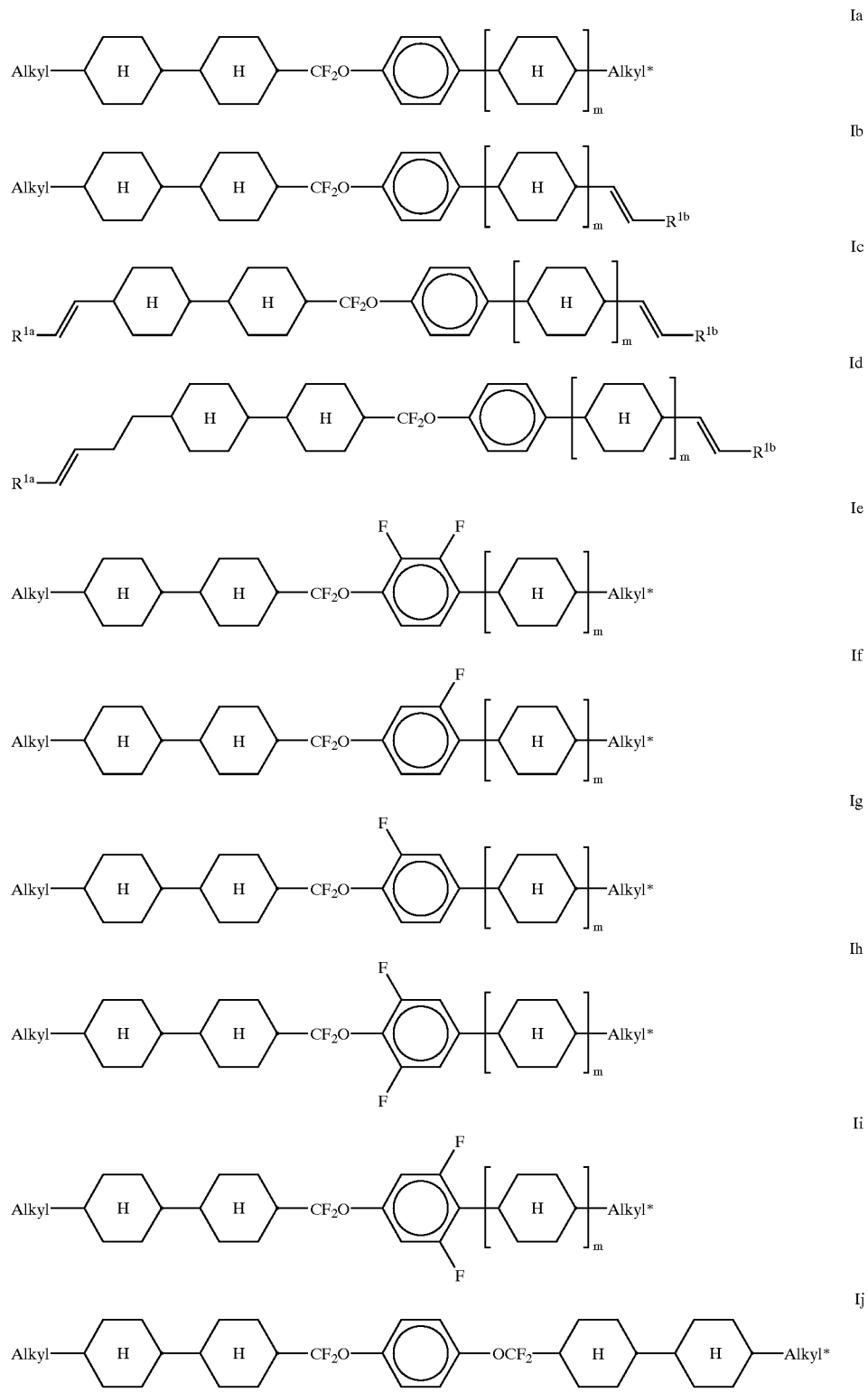

wherein $R^{1a}$ and $R^{1b}$ are each, independently of one another, H, $CH_3$, $C_2H_5$ or n-$C_3H_7$, m is 1 or 2, and Alkyl and Alkyl* are each, independently of one another, straight-chain or branched alkyl groups having 1–7 carbon atoms.

4. A liquid crystalline medium comprising at least one compound having formula I according to claim 1.

5. A liquid-crystalline medium derived from a mixture of polar compounds having positive dielectric anisotropy, wherein the medium is comprised of at least one compound of the formula I of claim 1, and wherein the medium is further comprised of at least one compound selected from the formulae II, III, IV, V, VI, VII and VIII:

II
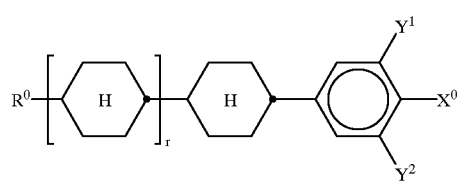

III
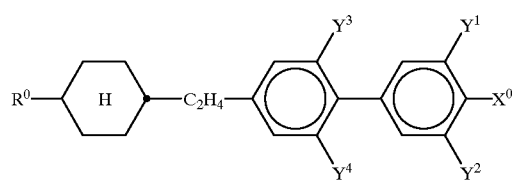

IV
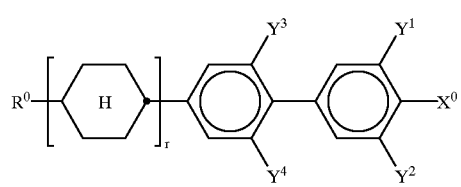

V
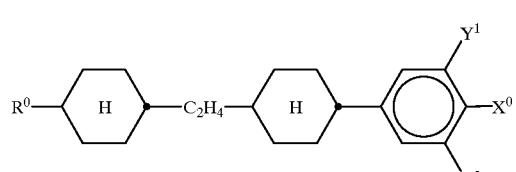

VI
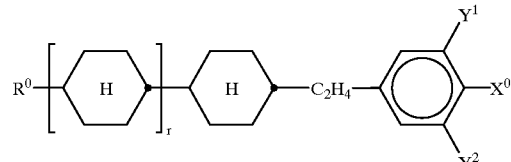

VII
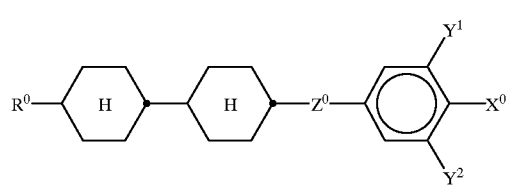

VIII
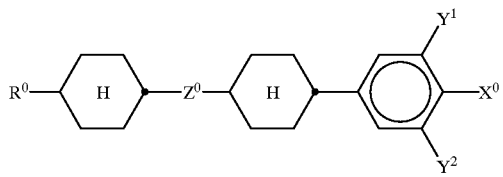

wherein $R^0$ is an n-alkyl, oxaalkyl, fluoroalkyl or alkenyl, each having 1 to 9 carbon atoms, wherein $X^0$ is F, Cl, a halogenated alkyl, alkenyl or alkoxy having 1 to 6 carbon atoms, or halogenated alkenyl having 2 to 6 carbon atoms, wherein $Z^0$ is —$C_4H_8$—, —$CF_2O$—, —$OCF_2$—, —$CH_2O$—, —$OCH_2$—, —CF=CF—, —$C_2F_4$— or —CH=CH—;

wherein $Y^1$ to $Y^4$ are each, independently of one another, H or F, and wherein r is 0 or 1.

6. A liquid-crystalline medium according to claim 5, wherein the proportion of compounds of the formulae I to VIII in the mixture is at least 50% by weight.

7. Liquid-crystalline medium according to claim 5, wherein the proportion of compounds of the formula I in the mixture is from 5 to 50% by weight.

8. An electro-optical device comprising a liquid-crystalline medium according to claim 5.

9. An electro-optical liquid-crystal display comprising a liquid-crystalline medium according to claim 5.

10. An electro-optical display comprising a pair of plane-parallel outer plates, integrated non-linear elements for switching individual pixels, and a nematic liquid-crystal mixture of positive dielectric anisotropy which is located in the cell and which is comprised of at least one compound according to claim 1.

11. A liquid-crystal mixture comprising at least one compound according to claim 1, wherein the mixture retains a nematic phase down to about −20° C. and has a clearing point above about 80° C.

12. A liquid-crystal mixture comprising at least one compound according to claim 1, wherein the mixture has a birefringence value of ≦0.080.

13. A liquid-crystal mixture comprising at least one compound according to claim 1, wherein the mixture has a TN threshold voltage of <2.5 V.

14. An electro-optical display according to claim 10, wherein the display is an MLC display.

15. A liquid-crystal mixture comprising at least one compound according to claim 1, wherein the mixture has a clearing point above 110° C.

16. A liquid-crystal mixture comprising at least one compound according to claim 1, wherein the mixture has a rotational viscosity at 20° C. of <200 mpa.s.

17. A liquid-crystal mixture comprising at least two compounds according to claim 1, wherein the compounds according to claim 1 comprise 5–50% of the entire mixture by weight.

18. A liquid-crystal mixture according to claim 5, wherein the mixture comprises 2–5 compounds according to formula II.

19. A liquid-crystal mixture according to claim 5, wherein $X^0$ is selected from F, Cl, $CF_3$, $OCF_3$ and $OCHF_3$.

20. A liquid-crystal mixture according to claim 5, wherein compounds of the formulae I to VIII comprise at least 50% of the mixture by weight.

* * * * *